United States Patent
Kojima et al.

(10) Patent No.: US 7,866,451 B2
(45) Date of Patent: Jan. 11, 2011

(54) DAMPER AND AUTOMOBILE SEAT HAVING THE DAMPER

(75) Inventors: Masamitsu Kojima, Fujisawa (JP); Atsushi Arai, Fujisawa (JP); Takeshi Yamaguchi, Fujisawa (JP); Yoshihiro Harada, Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 12/071,443

(22) Filed: Feb. 21, 2008

(65) Prior Publication Data
US 2008/0169696 A1    Jul. 17, 2008

Related U.S. Application Data

(63) Continuation of application No. 10/991,088, filed on Nov. 18, 2004, now Pat. No. 7,357,230, which is a continuation of application No. 10/074,235, filed on Feb. 14, 2002, now abandoned.

(30) Foreign Application Priority Data

Feb. 14, 2001 (JP) .............................. 2001-037774
Apr. 26, 2001 (JP) .............................. 2001-130296

(51) Int. Cl.
*F16D 57/02* (2006.01)
(52) U.S. Cl. ........................ 188/268; 188/290
(58) Field of Classification Search ................ 188/268, 188/300, 374–379; 74/574.3–574.4
See application file for complete search history.

(56) References Cited

U.S. PATENT DOCUMENTS

| | | | |
|---|---|---|---|
| 1,939,173 A * | 12/1933 | Junkers ...................... | 74/574.4 |
| 3,058,371 A | 10/1962 | Haushalter | |
| 3,343,377 A | 9/1967 | Loupere | |
| 3,410,369 A * | 11/1968 | Ishizuka ...................... | 188/379 |
| 3,467,353 A | 9/1969 | Peterson et al. | |
| 3,504,905 A | 4/1970 | Irwin | |
| 3,767,503 A | 10/1973 | Maddalena | |
| 3,833,093 A | 9/1974 | Robinson | |
| 3,842,945 A | 10/1974 | Potter | |
| 3,861,503 A | 1/1975 | Nash | |
| 3,953,012 A | 4/1976 | Robinson | |
| 3,992,963 A * | 11/1976 | Khanna ...................... | 74/573.12 |
| 4,086,984 A | 5/1978 | Johansson | |
| 4,117,637 A | 10/1978 | Robinson | |
| 4,218,349 A | 8/1980 | Minatono et al. | |

(Continued)

FOREIGN PATENT DOCUMENTS

DE    1 126 684    3/1962

(Continued)

OTHER PUBLICATIONS

Kojima et al., Grandparent U.S. Appl. No. 10/074,235, filed Feb. 14, 2002.

*Primary Examiner*—Christopher P Schwartz
(74) *Attorney, Agent, or Firm*—Nixon & Vanderhye P.C.

(57) ABSTRACT

A damper (1) has silicone-based unvulcanized rubber (4) interposed between a housing (2) and a shaft (3) which are disposed in such a manner as to be relatively rotatable about an axis (A) in (R) directions with respect to each other, and rotational energy between the housing (2) and the shaft (3) is absorbed through the deformation of the silicone-based unvulcanized rubber (4).

16 Claims, 21 Drawing Sheets

U.S. PATENT DOCUMENTS

| | | | |
|---|---|---|---|
| 4,224,835 A * | 9/1980 | Bauer | 74/574.4 |
| 4,254,847 A * | 3/1981 | Kamman et al. | 188/379 |
| 4,271,935 A | 6/1981 | Pelat et al. | |
| 4,368,807 A * | 1/1983 | McLean et al. | 188/379 |
| 4,378,865 A * | 4/1983 | McLean | 188/379 |
| 4,480,731 A | 11/1984 | Izeki et al. | |
| 4,545,466 A | 10/1985 | Izeki et al. | |
| 4,691,589 A | 9/1987 | Arakawa | |
| 4,701,491 A * | 10/1987 | Lamont et al. | 524/493 |
| 4,731,966 A | 3/1988 | Fujita et al. | |
| 4,768,761 A | 9/1988 | Kramer | |
| 4,850,243 A * | 7/1989 | George | 74/574.4 |
| 5,030,490 A | 7/1991 | Bronowicki et al. | |
| 5,161,655 A | 11/1992 | Shimoda | |
| 5,286,014 A | 2/1994 | Chakko | |
| 5,301,775 A | 4/1994 | Nedbal et al. | |
| 5,335,563 A | 8/1994 | Yamamoto et al. | |
| 5,601,170 A * | 2/1997 | Martin et al. | 192/58.681 |
| 5,605,208 A | 2/1997 | Friedrichsen et al. | |
| 5,718,309 A | 2/1998 | Kariya | |
| 6,041,899 A | 3/2000 | Takamatsu | |
| 6,085,384 A | 7/2000 | Bivens | |
| 6,089,204 A * | 7/2000 | Shaffer | 123/192.1 |
| 6,135,252 A | 10/2000 | Knotts | |
| 6,386,528 B1 | 5/2002 | Thorn et al. | |
| 7,357,230 B2 * | 4/2008 | Kojima et al. | 188/290 |
| 2005/0179184 A1 | 8/2005 | Kojima et al. | |

FOREIGN PATENT DOCUMENTS

| | | |
|---|---|---|
| DE | 2 307 823 | 9/1973 |
| DE | OFF 27 22 542 | 11/1978 |
| DE | 3844544 A1 | 12/1989 |
| EP | 0 639 727 A1 | 2/1995 |
| JP | 63231029 | 9/1988 |
| JP | 2-26332 | 1/1990 |
| JP | 3-338 | 1/1991 |
| JP | 3-68249 | 10/1991 |
| JP | 3-71577 | 11/1991 |
| JP | 10-299809 | 11/1998 |
| JP | 10-318318 | 12/1998 |
| JP | 11-94001 | 4/1999 |
| JP | 2605841 | 8/2000 |

* cited by examiner

F I G. 20
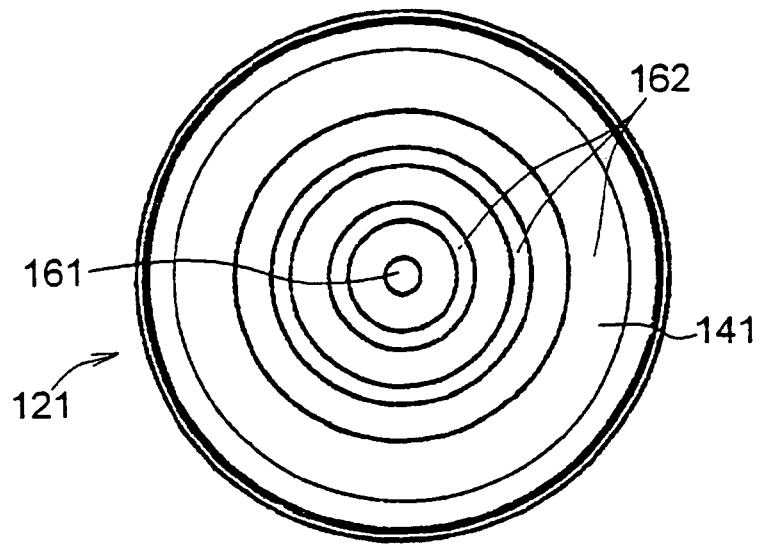
F I G. 21
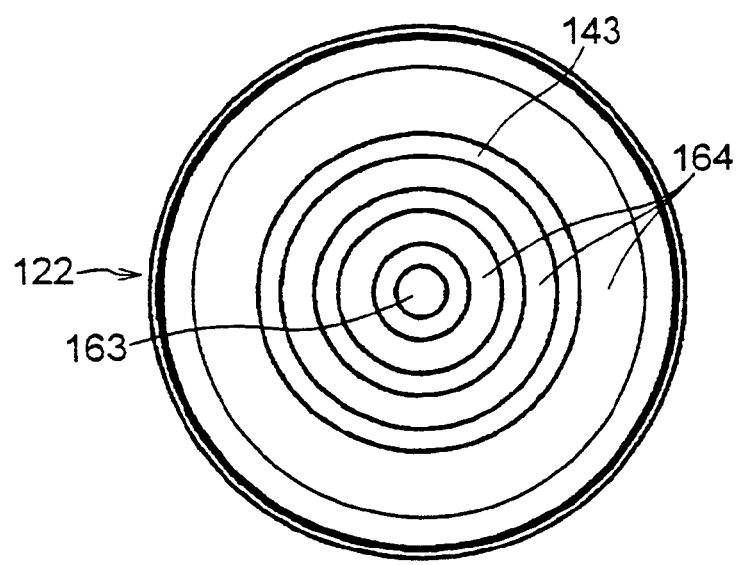

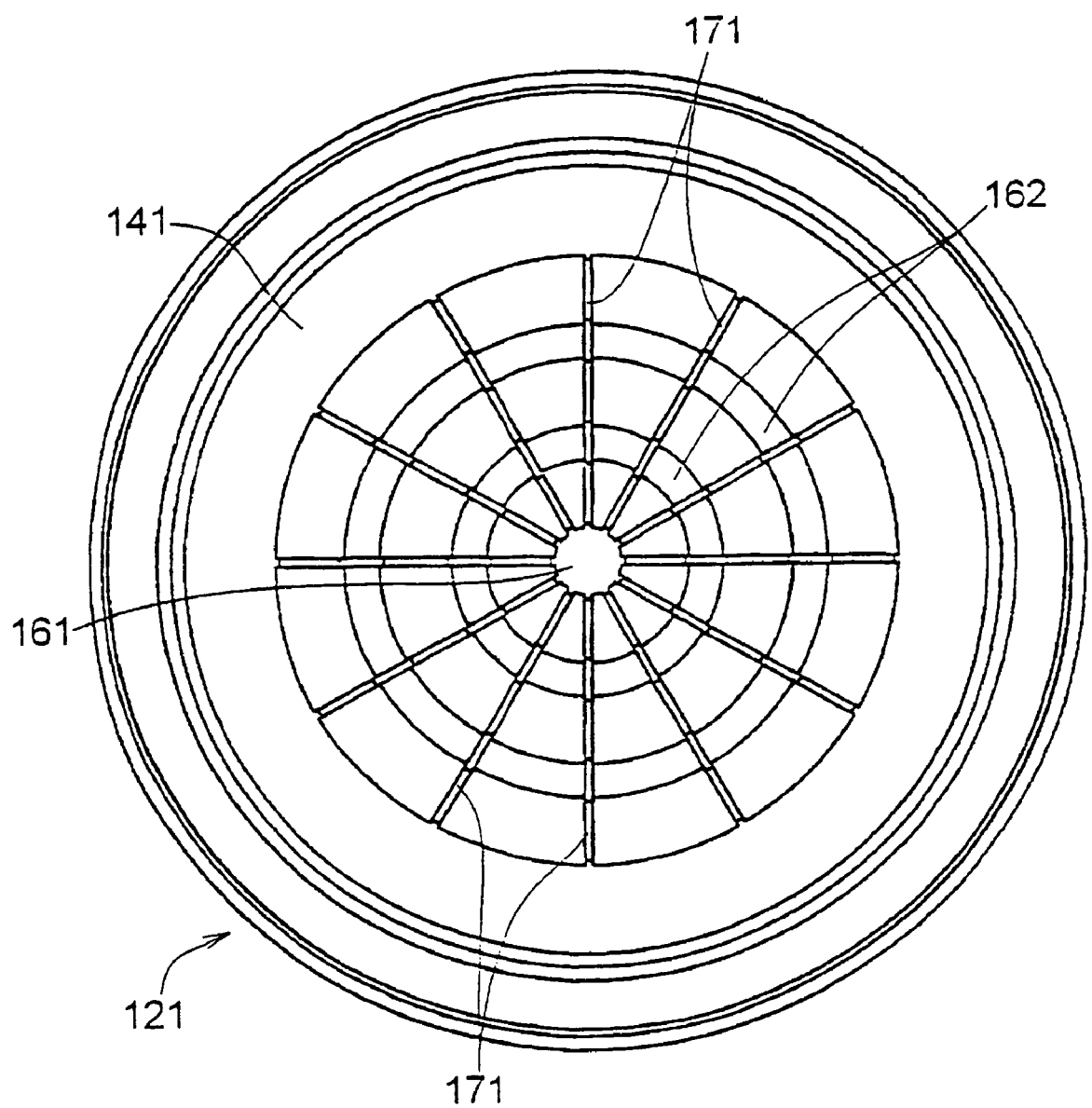
F I G. 25

F I G. 26
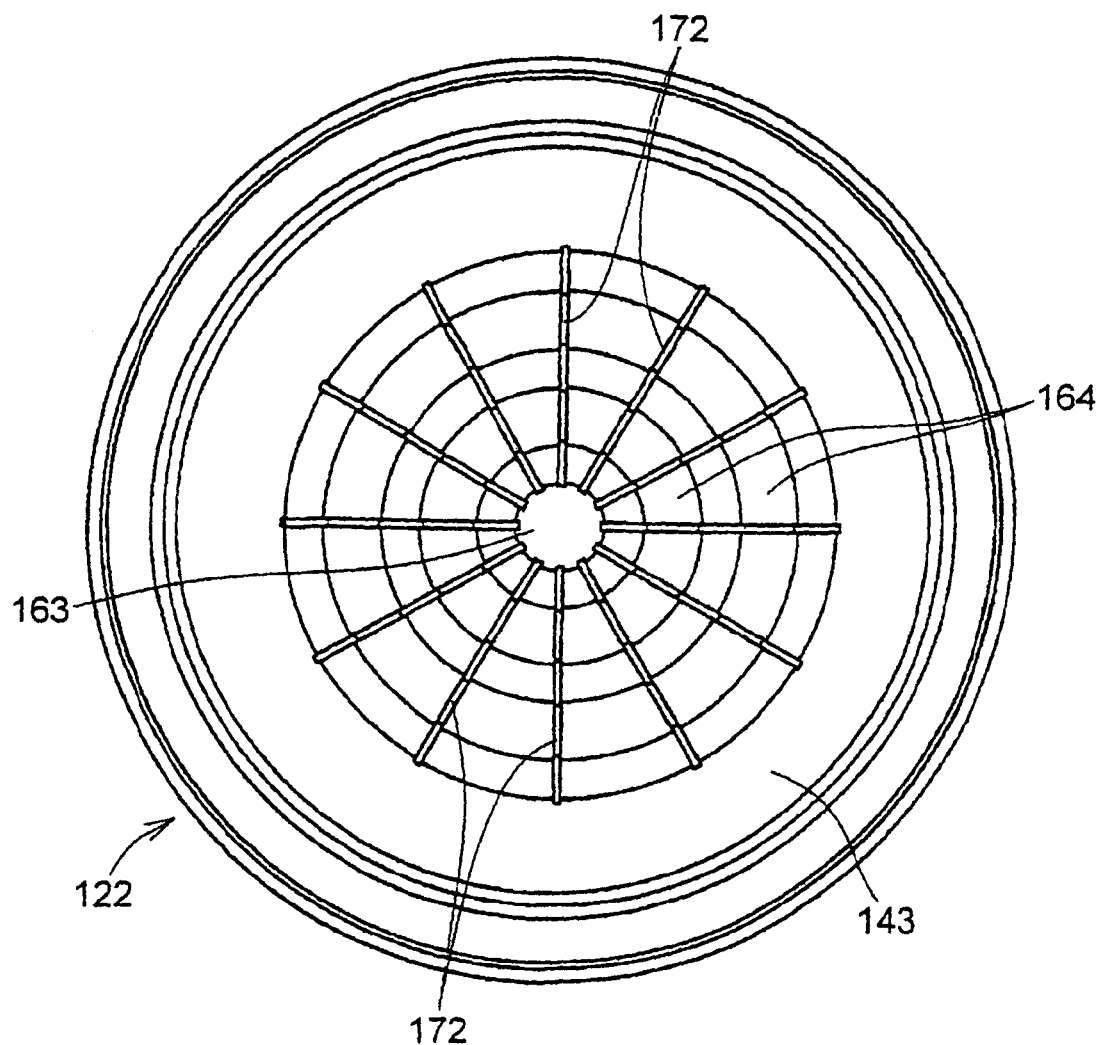

F I G. 31
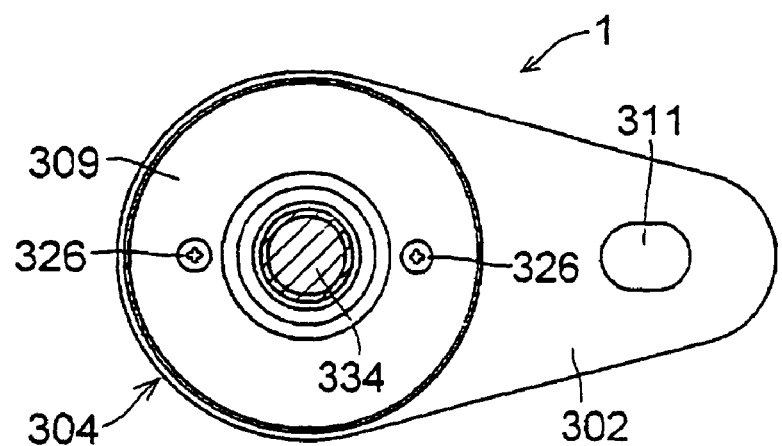
F I G. 32
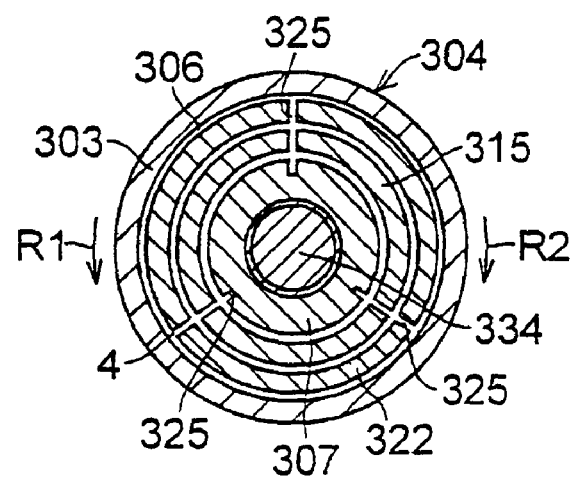

DAMPER AND AUTOMOBILE SEAT HAVING THE DAMPER

CROSS REFERENCE TO RELATED APPLICATION

This is a continuation of U.S. application Ser. No. 10/991,088, filed Nov. 18, 2004, now allowed, which is a continuation of U.S. application Ser. No. 10/074,235, filed Feb. 14, 2002, now abandoned, each incorporated herein by reference in its entirety.

BACKGROUND OF THE INVENTION

1. Field of the Invention

The present invention relates to a damper for absorbing moving energy between a pair of members disposed relatively movably with respect to each other so as to damp the relative movement of the pair of members, as desired. More particularly, the present invention concerns a damper for an automobile seat for absorbing the rotational energy of a rear seat of an automobile arranged to be, for example, rotatable (capable of springing up) so as to be able to eliminate such as a shock occurring in the rear seat at the time of its springing up or returning, sudden springing up of the rear seat due to sudden braking when the rear seat is unlocked, and sudden returning of the sprung-up rear seat due to sudden acceleration, as well as an automobile seat having this damper.

2. Description of the Related Art

As dampers, various dampers are known including a friction damper making use of sliding friction, a fluid damper making use of a fluid, a viscous damper making use of a viscous material, and a lead damper making use of lead. However, the friction damper is accompanied by wear in conjunction with friction and undergoes the deterioration of its characteristics over long periods of use. The fluid damper and the viscous damper are bound to become large in size to obtain a large damping force, and require seals for preventing the leakage of the fluid and the viscous material. The lead damper brings about an increase in weight due to lead, and is difficult to be applied to an apparatus which needs to be made lightweight.

In addition, as a damper for a backrest of an automobile seat, one making use of a fluid is known, but such a damper making use of the fluid is bound to become large in size to obtain a large damping force, and requires a large-scale seal for preventing the leakage of the fluid. In particular, in the case of the damper for an automobile seat in which a backrest is arranged to be folded down and the seat is arranged to be subsequently sprung up in order to secure a large accommodation space within the vehicle compartment, it is necessary to damp large rotational energy based on the total load of the backrest and the seat, so that it is difficult for a compact damper merely making use of a fluid to obtain a targeted large damping force.

SUMMARY OF THE INVENTION

Accordingly, the invention has been devised in view of the above-described various aspects, and its object is to provide a damper which has no possibility of wear and makes it possible to eliminate a seal for preventing leakage and to easily obtain a large damping force even if the damper is lightweight and compact.

Another object of the invention is to provide a damper which makes it possible to obtain a large damping force and can be made compact and which is particularly suitable for an automobile seat in which a backrest is arranged to be folded down and a seat is arranged to be subsequently sprung up, as well as an automobile seat having this damper.

In accordance with a first aspect of the invention, there is provided a damper comprising silicone-based unvulcanized rubber interposed between a pair of members disposed in such a manner as to be relatively movable with respect to each other. In accordance with a second aspect of the invention, there is provided a damper comprising silicone-based unvulcanized rubber interposed between a pair of members disposed in such a manner as to be relatively movable with respect to each other, relative moving energy between the pair of members being absorbed through the deformation of the silicone-based unvulcanized rubber.

According to the damper in accordance with the above-described first and second aspects, since the damping function is arranged to be obtained by the silicone-based unvulcanized rubber, there is no risk of wear, a seal for preventing leakage can be omitted, and a large damping force can be easily obtained even if the damper is lightweight and compact.

As in the damper in accordance with a third aspect of the invention, the silicone-based unvulcanized rubber is sufficient if it has a degree of plasticity of not less than 30 and not more than 420. Preferably, however, as in the damper in accordance with a fourth aspect of the invention, the silicone-based unvulcanized rubber has a degree of plasticity of not less than 60 and not more than 320. More preferably, as in the damper in accordance with a fifth aspect of the invention, the silicone-based unvulcanized rubber has a degree of plasticity of not less than 160 and not more than 320.

The degree of plasticity in the invention is a value measured by a William plastometer standardized by the American Society for Testing and Materials (ASTM) and the like. Specifically, the silicone-based unvulcanized rubber which has a cylindrical shape with a diameter of approximately 1.43 cm and a height of 1.27 cm and has a volume of 2 cc is sandwiched by two upper and lower parallel plates, and is compressed by a load of 5 kg at 70° C. to 100° C., and is pressurized for 3 minutes, and the degree of plasticity is expressed by the height (mm/100) of the silicone-based unvulcanized rubber after the pressurization.

In the invention, the silicone-based unvulcanized rubber is sufficient if it has a degree of plasticity of not less than 30 and not more than 420. However, if the degree of plasticity is smaller than 30, the silicone-based unvulcanized rubber is liable to flow, and the silicone-based unvulcanized rubber disposed between the pair of members requires sufficient sealing for preventing its leakage, and it becomes difficult to expect a large damping force. If the degree of plasticity is greater than 420, the affinity of the silicone-based unvulcanized rubber with contact surfaces of the pair of members is practically lost, and the pair of members slip with respect to the silicone-based unvulcanized rubber in the relative movement of the pair of members with respect to each other, thereby making it difficult to obtain a substantial damping force based on the deformation of the silicone-based unvulcanized rubber. In addition, even if the surfaces of the pair of members in contact with such silicone-based unvulcanized rubber are formed as uneven surfaces for preventing the slippage, and the silicone-based unvulcanized rubber is gripped, since the silicone-based unvulcanized rubber having a degree of plasticity greater than 420 is extremely brittle, the silicone-based unvulcanized rubber is easily sheared (torn apart) in the relative movement of the pair of members with respect to each other, which also makes it difficult to obtain the damping force based on the deformation of the silicone-based unvulcanized rubber.

In addition, the silicone-based unvulcanized rubber is normally filled in the gap between the pair of members, if its degree of plasticity is greater than 420, it becomes extremely difficult to fill the silicone-based unvulcanized rubber between the pair of members without a gap. If a gap is produced between each of the pair of members and the silicone-based unvulcanized rubber after the filling of the silicone-based unvulcanized rubber, there is a possibility that a desired damping force cannot be obtained.

From the above-described perspectives of the unnecessariness of the seal, the magnitude of the damping force obtained, affinity, brittleness, the ease of filling, durability, and the like, the degree of plasticity of the silicone-based unvulcanized rubber is preferably not less than 60 and not more than 320, more preferably not less than 160 and not more than 320, as described above. If the degree of plasticity is not less than 60, the fluidity of the silicone-based unvulcanized rubber is practically lost, and the leakage of the silicone-based unvulcanized rubber can be prevented by a simple sealing mechanism. If the degree of plasticity is not less than 160, the sealing mechanism can be practically omitted, and a relatively large damping force can be obtained. On the other hand, if the degree of plasticity of the silicone-based unvulcanized rubber is greater than 420, its affinity with the contact surfaces of the pair of members becomes lost, as described above, and the silicone-based unvulcanized rubber becomes brittle and is easily sheared. However, in the case of the silicone-based unvulcanized rubber having a degree of plasticity of not more than 320, its affinity with the contact surfaces of the pair of members improves, and the silicone-based unvulcanized rubber undergoes deformation without much slipping with respect to the contact surfaces of the pair of members in the relative movement of the pair of members with respect to each other, thereby making it easy to obtain a targeted damping force. Furthermore, the brittleness disappears, and the silicone-based unvulcanized rubber desirably undergoes plastic deformation in correspondence with the relative movement of the pair of members with respect to each other; thus, even if the pair of members having the uneven surfaces formed thereon for gripping the silicone-based unvulcanized rubber are used, it is possible to avoid a situation in which the silicone-based unvulcanized rubber is sheared into pieces.

In the invention, as in the damper in accordance with a sixth aspect, the pair of members are disposed in such a manner as to be relatively rotatable with respect to each other. Such a damper in accordance with the sixth aspect is generally used for absorbing the rotational energy of a rotating member.

In the invention, as in the damper in accordance with a seventh aspect, at least one of the pair of members has an uneven surface in contact with the silicone-based unvulcanized rubber. Here, the uneven surface may be adapted to prevent the slippage of the silicone-based unvulcanized rubber in a vicinity of the uneven surface in the relative movement of the pair of members. The uneven surface may be embodied by discretely disposed projections or grooves or by continuous projections or grooves, as will be described later, or may be embodied by a matte finished or wrinkled uneven surface.

Such an uneven surface functions so as to grip the silicone-based unvulcanized rubber in the vicinity of the uneven surface, with the result that it is possible to prevent the slippage between each of the pair of members and the silicone-based unvulcanized rubber in the relative movement of the pair of members, and desired plastic deformation is caused in the silicone-based unvulcanized rubber, thereby allowing the silicone-based unvulcanized rubber to absorb the targeted energy. In cases where the surfaces of the silicone-based unvulcanized rubber and the pair of members in contact therewith exhibit good affinity, and the slippage does not occur between each of the pair of members and the silicone-based unvulcanized rubber, as described above, or that slippage is allowed, the surface of at least one of the pair of members may be formed not as an uneven surface but as a smooth surface.

In the invention, as in the damper in accordance with an eighth aspect, at least one of the pair of members may have, on a surface thereof in contact with the silicon-based unvulcanized rubber, one of a projection and a groove extending in a direction intersecting a direction of the relative movement.

Such a projection or a groove functions in the same way as the uneven surface of the damper in accordance with the seventh aspect and grips the silicone-based unvulcanized rubber in the vicinity of the projection or the groove. Consequently, it is possible to prevent the slippage between each of the pair of members and the silicone-based unvulcanized rubber in the relative movement of the pair of members, and the silicone-based unvulcanized rubber is made to undergo desired deformation to thereby absorb the targeted energy. In the same way as the uneven surface, in cases where the surfaces of the silicone-based unvulcanized rubber and the pair of members in contact therewith exhibit good affinity, and the slippage does not occur between each of the pair of members and the silicone-based unvulcanized rubber, as described above, or that slippage is allowed, the surface of at least one of the pair of members may be formed as a smooth surface without having the above-described projection or groove.

In the damper in accordance with the eighth aspect, the surface in contact with the silicone-based unvulcanized rubber may include a cylindrical surface as in the damper in accordance with a ninth aspect or may include one of an annular surface and a disk-like surface as in the damper in accordance with a 10th aspect. In the case of the ninth aspect, one of the projection and the groove preferably extends substantially parallel to a center line of the cylindrical surface, and in the case of the 10th aspect, one of the projection and the groove preferably extends in a radial direction of the one of the annular surface and the disk-like surface.

In the invention, as in the damper in accordance with an 11th aspect, the pair of members may be disposed in such a manner as to be relatively linearly movable with respect to each other. Such a damper in accordance with the 11th aspect is generally used for absorbing the linearly moving energy of a linearly moving member.

In the damper in accordance with the invention, one of the pair of members is generally fixed, while the other member is disposed movably with respect to the one member. However, such members may be members (parts) of a machine or an apparatus whose movement is to be damped, or may alternatively be members added to such a machine or an apparatus. In addition, the silicone-based unvulcanized rubber in accordance with the invention is sufficient if it is interposed between the pair of members, the silicone-based unvulcanized rubber is generally used by being closely filled in a space (gap) formed between the pair of members.

The damper in accordance with a 12th aspect of the invention is a damper for an automobile seat which includes a housing serving as the one member and having an arm portion and a housing body integral to the arm portion, and a gap forming member serving as the other member and accommodated rotatably in the housing body, the gap forming member forming a gap in cooperation with an inner surface of the housing body, the silicone-based unvulcanized rubber being disposed in the gap, the damper being adapted to transmit the rotation of the automobile seat to the housing by means of the arm portion, and the gap forming member being adapted to be fixed to a chassis on which the automobile seat is rotatably installed.

The damper in accordance with a 13th aspect of the invention is a damper for an automobile seat which includes a housing serving as the one member and having an arm portion and a housing body integral to the arm portion, and a gap forming member serving as the other member and accommodated rotatably in the housing body, the gap forming member forming a gap in cooperation with an inner surface of the housing body, the silicone-based unvulcanized rubber being disposed in the gap, the housing being adapted to be fixed by means of the arm portion to a chassis on which the automobile seat is rotatably installed, and the damper being adapted to transmit the rotation of the automobile seat to the gap forming member.

The damper in accordance with a 14th aspect of the invention is a damper for an automobile seat which includes a housing serving as the one member and having a collar portion and a housing body integral to the collar portion, and a gap forming member serving as the other member and accommodated rotatably in the housing body, the gap forming member forming a gap in cooperation with an inner surface of the housing body, the silicone-based unvulcanized rubber being disposed in the gap, the damper being adapted to transmit the rotation of the automobile seat to the housing by means of the collar portion, and the gap forming member being adapted to be fixed to a chassis on which the automobile seat is rotatably installed.

The damper in accordance with a 15th aspect of the invention is a damper for an automobile seat which includes a housing serving as the one member and having a collar portion and a housing body integral to the collar portion, and a gap forming member serving as the other member and accommodated rotatably in the housing body, the gap forming member forming a gap in cooperation with an inner surface of the housing body, the silicone-based unvulcanized rubber being disposed in the gap, the housing being adapted to be fixed by means of the collar portion to a chassis on which the automobile seat is rotatably installed, and the damper being adapted to transmit the rotation of the automobile seat to the gap forming member.

According to the above-described damper for an automobile seat, since the damping function is arranged to be obtained by the silicone-based unvulcanized rubber, there is no risk of wear, a seal for preventing leakage can be omitted, and a large damping force can be easily obtained even if the damper is lightweight and compact.

In the invention, as in the damper for an automobile seat in accordance with a 16th aspect, the housing body has a plurality of concentric arcuate projections, and the gap forming member has a plurality of concentric hollow cylindrical recessed portions in which the arcuate projections of the housing body are respectively disposed with the gap therebetween.

According to the damper for an automobile seat in accordance with the 16th aspect, the area of the silicone-based unvulcanized rubber in contact with the housing body and the gap forming member in the gap can be enlarged, so that it is possible to obtain an even greater energy absorbing capability even if the damper is made compact.

In addition, in the invention, as in the damper for an automobile seat in accordance with a 17th aspect, a slit extending radially and communicating with the gap is preferably formed in the gap forming member.

According to the damper for an automobile seat in accordance with the 17th aspect, since the silicone-based unvulcanized rubber can be filled also in the slit communicating with the gap, it is possible to prevent the slippage of the silicone-based unvulcanized rubber with respect to the gap forming member by means of the slit. Moreover, when the silicone-based unvulcanized rubber is filled into the gap, the filling can be effected through that slit, so that the silicone-based unvulcanized rubber can be reliably and easily filled into the gap, and it is possible to avoid the occurrence of a gap portion in which the silicone-based unvulcanized rubber is not filled between the silicone-based unvulcanized rubber and each of the housing body and the gap forming member.

An automobile seat in accordance with the invention comprises the damper for an automobile seat according to any one of the above-described aspects, and a seat provided rotatably on the automobile chassis, the rotation of the seat being transmitted to one of the housing and the gap forming member, and another one of the housing and the gap forming member being fixed to the chassis.

According to the above-described automobile seat in accordance with the invention, since the damping function is arranged to be obtained by the silicone-based unvulcanized rubber, it is possible to obtain the effects derived from the above-described damper, and it is possible to eliminate such as a shock occurring in the seat, e.g., a rear seat at the time of its springing up or returning, sudden springing up of the seat due to sudden braking when the seat is unlocked, and sudden returning of the sprung-up seat due to sudden acceleration.

In the invention, as in the automobile seat in accordance with its second aspect, the seat is preferably provided with a backrest rotatably. It should be noted that the automobile seat in accordance with the invention is not limited to such a seat on which a backrest is rotatably provided, and the seat is not limited to the rear seat, and may be another seat inside the automobile.

According to the damper in accordance with the various aspects of the invention described above, it is possible to provide a damper which has no possibility of wear and makes it possible to eliminate a seal for preventing leakage and to easily obtain a large damping force even if the damper is lightweight and compact.

According to the damper in accordance with the various aspects of the invention described above, it is possible to provide a damper which makes it possible to obtain a large damping force and can be made compact and which is particularly suitable for an automobile seat in which a backrest is arranged to be folded down and a seat is arranged to be subsequently sprung up, as well as an automobile seat having this damper.

Hereafter, a description will be given of the present invention with reference to the preferred embodiments shown in the drawings. It should be noted that the present invention is not limited to these embodiments.

BRIEF DESCRIPTION OF THE DRAWINGS

FIGS. 1A and 1B are explanatory diagrams of a preferred embodiment of the invention, in which FIG. 1A is a cross-sectional view taken in the direction of arrows along line Ia-Ia shown in FIG. 1B, and FIG. 1B is a cross-sectional view taken in the direction of arrows along line Ib-Ib shown in FIG. 1A;

FIGS. 2A and 2B are explanatory diagrams of another preferred embodiment of the invention, in which FIG. 2A is a cross-sectional view taken in the direction of arrows along line IIa-IIa shown in FIG. 2B, and FIG. 2B is a cross-sectional view taken in the direction of arrows along line IIb-IIb shown in FIG. 2A;

FIGS. 3A and 3B are explanatory diagrams of still another preferred embodiment of the invention, in which FIG. 3A is a cross-sectional view taken in the direction of arrows along line IIIa-IIIa shown in FIG. 3B, and FIG. 3B is a cross-sectional view taken in the direction of arrows along line IIIb-IIIb shown in FIG. 3A;

FIG. 20 is an explanatory diagram of a right-hand side surface of one disk-like member of the embodiment shown in FIG. 19;

FIG. 21 is an explanatory diagram of a left-hand side surface of the other disk-like member of the embodiment shown in FIG. 19;

FIG. 25 is an explanatory diagram of a right-hand side surface of one disk-like member of the embodiment shown in FIG. 24;

FIG. 26 is an explanatory diagram of a left-hand side surface of the other disk-like member of the embodiment shown in FIG. 24;

FIG. 31 is a view taken in the direction of arrows along line XXXI-XXXI shown in FIG. 30;

FIG. 32 is a cross-sectional view taken in the direction of arrows along line XXXII-XXXII shown in FIG. 30;

DESCRIPTION OF THE PREFERRED EMBODIMENTS

Figure 1A:
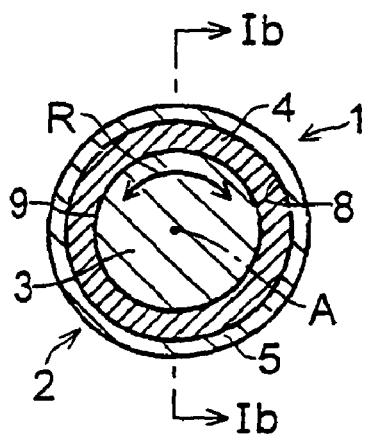
Figure 1B:
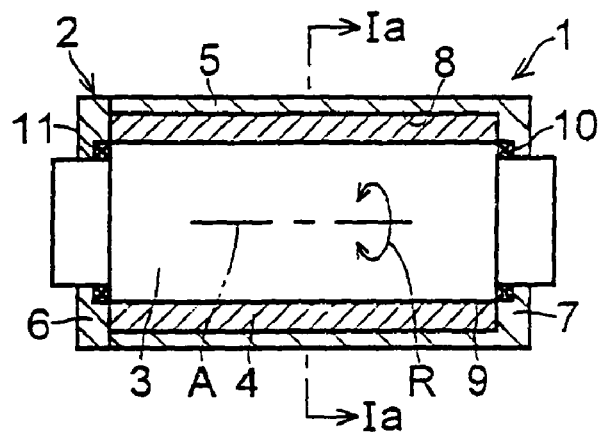

In FIGS. 1A and 1B, a damper 1 in this embodiment has silicone-based unvulcanized rubber 4 interposed between a housing 2 and a shaft 3 which serve as a pair of members arranged to be relatively movable with respect to each other, or rotatable about an axis A in R directions in this embodiment. The damper 1 is adapted to absorb relative rotational energy in the R directions between the housing 2 and the shaft 3 through the deformation of the silicone-based unvulcanized rubber 4.

The housing 2 has a hollow cylindrical member 5 with a bottom and a cover member 6 secured to the hollow cylindrical member 5, and the shaft 3 is disposed in such a manner as to be passed through a bottom portion 7 of the hollow cylindrical member 5 and the cover member 6. The silicone-based unvulcanized rubber 4 having a degree of plasticity of not less than 30 and not more than 420, preferably not less than 60 and not more than 320, more preferably not less than 160 and not more than 320, is disposed in the housing 2 by being filled in an annular gap between an inner cylindrical surface 8 of the hollow cylindrical member 5 and an outer cylindrical surface 9 of the shaft 3 in close contact with the cylindrical surfaces 8 and 9.

In the damper 1 of this embodiment, seal rings 10 and 11 are respectively fitted between the bottom portion 7 and the shaft 3, and between the cover member 6 and the shaft 3. In a case where the silicone-based unvulcanized rubber 4 does not have much fluidity, the seal rings 10 and 11 may be omitted.

In a case where the damper 1 shown in FIGS. 1A and 1B is used for a hinge mechanism such as an openable cover of an apparatus, for example, the housing 2 is secured to such as a frame of the apparatus, while the shaft 3 is linked to a shaft of the hinge mechanism or is used as the shaft itself of the hinge mechanism.

In the damper 1 used for such an apparatus, deformation is caused in the silicone-based unvulcanized rubber 4 by the rotation of the shaft 3 in the R direction at the time of opening or closing of the cover or the like, and the rotational energy of the cover is absorbed through the deformation of the silicone-based unvulcanized rubber 4, thereby making it possible to prevent a shock from occurring at the time of the opening or closing.

According to the damper 1, since the damping function is arranged to be obtained by the silicone-based unvulcanized rubber 4, there is no possibility of wear, and a large damping force can be easily obtained even if the damper 1 is lightweight and compact. Moreover, by using the silicone-based unvulcanized rubber 4 having such a large degree of plasticity that the silicone-based unvulcanized rubber 4 does not substantially undergo natural fluidity, it is possible to omit the seal rings 10 and 11 for prevention of leakage.

Figure 2A:
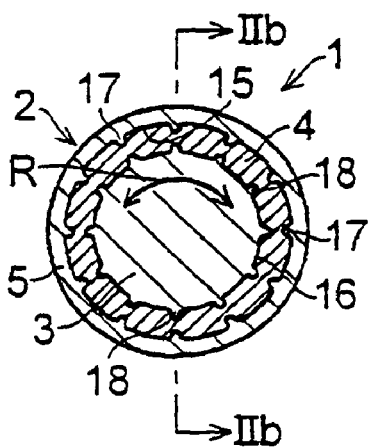
Figure 2B:
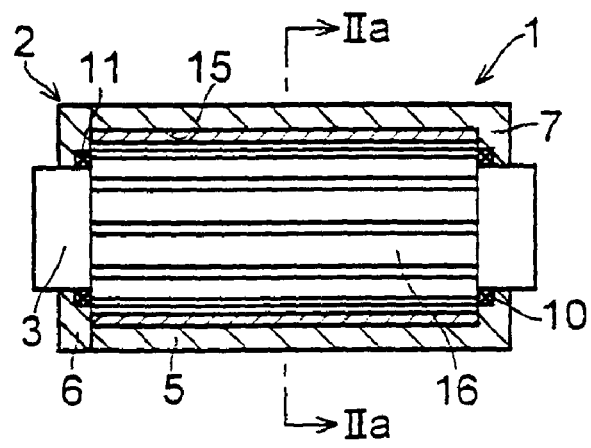

With the damper 1 shown in FIGS. 1A and 1B, the hollow cylindrical member 5 and the shaft 3 respectively have the cylindrical surfaces 8 and 9 which are smooth, and the silicone-based unvulcanized rubber 4 is closely filled in a cylindrical gap defined by the cylindrical surfaces 8 and 9 in close contact with the cylindrical surfaces 8 and 9. Alternatively, however, at least one of the housing 2 and the shaft 3, or both of the housing 2 and the shaft 3 in this embodiment, may have cylindrical uneven surfaces 15 and 16 in contact with the silicone-based unvulcanized rubber 4, as shown in FIGS. 2A and 2B. The uneven surface 15 is formed as the cylindrical inner peripheral surface of the hollow cylindrical member 5 of the housing 2, while the uneven surface 16 is formed as the cylindrical outer peripheral surface of the shaft 3. The uneven surfaces 15 and 16 grip the silicone-based unvulcanized rubber 4 in the vicinities of the uneven surfaces 15 and 16 in the relative rotation of the housing 2 and the shaft 3 about the axis A in the R directions, thereby preventing the slippage of the silicone-based unvulcanized rubber 4 with respect to the uneven surfaces 15 and 16.

The uneven surface 15 is formed on the surface, i.e., the aforementioned cylindrical surface 8, of the hollow cylindrical member 5 of the housing 2 in contact with the silicone-based unvulcanized rubber 4 by a plurality of projections 17 extending in directions intersecting the R direction, i.e., in directions perpendicular thereto in this embodiment. Similarly, the uneven surface 16 is formed on the surface, i.e., the aforementioned cylindrical surface 9, of the shaft 3 in contact with the silicone-based unvulcanized rubber 4 by a plurality of projections 18 extending in directions intersecting the R direction, i.e., in directions perpendicular thereto in this embodiment.

With the damper 1 shown in FIGS. 2A and 2B and provided with the housing 2 and the shaft 3 in which the projections 17 and 18 extending in directions perpendicular to the R direction are respectively provided on the cylindrical surface 8 and the cylindrical surface 9 which are surfaces in contact with the silicone-based unvulcanized rubber 4, it is possible to prevent the slippage between, on the one hand, the housing 2 and the shaft 3 and, on the other hand, the silicone-based unvulcanized rubber 4 in the relative rotation of the housing 2 and the shaft 3 in the R directions. Hence, the silicone-based unvulcanized rubber 4 is allowed to undergo desired plastic deformation, thereby making it possible to cause the silicone-based unvulcanized rubber 4 to effectively absorb the targeted energy.

In the damper 1 shown in FIGS. 2A and 2B, the seal rings 10 and 11 similar to those of the damper 1 shown in FIGS. 1A and 1B are used for preventing the leakage of the silicone-based unvulcanized rubber 4. Instead of these seal rings 10 and 11, labyrinths 21 and 22 may be used to prevent the leakage of the silicone-based unvulcanized rubber 4, as shown in FIG. 3B. As shown in enlarged form in FIG. 4A, the labyrinth 21 is formed by two annular projections 26 formed integrally on a stepped portion 25 between a large-diameter portion 23 and a small-diameter portion 24 of the shaft 3 as well as a plurality of annular grooves 27 which are formed in the bottom portion 7 of the hollow cylindrical member 5 and into which the projections 26 are inserted and fitted. The labyrinth 22 is formed in a similar manner.

Figure 3A:
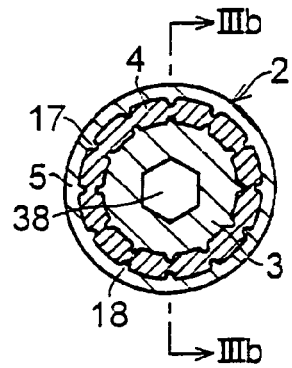
Figure 3B:
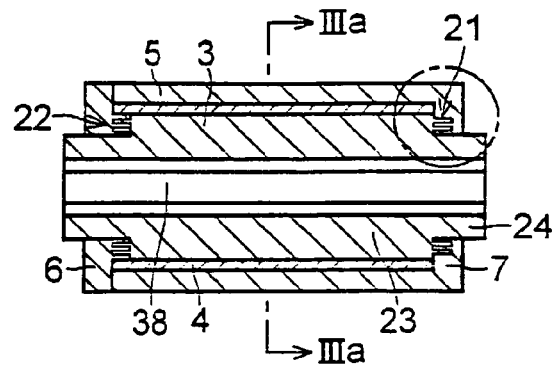
Figure 4A:
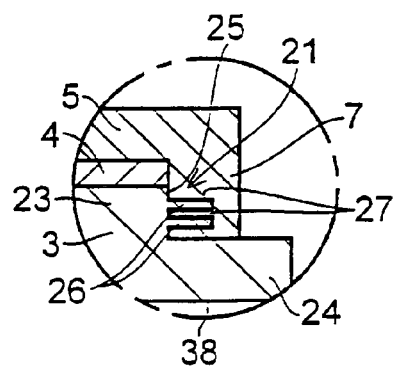
FIGS. 4A and 4B are enlarged explanatory diagrams of a portion of the embodiment shown in FIGS. 3A and 3B.
Figure 4B:
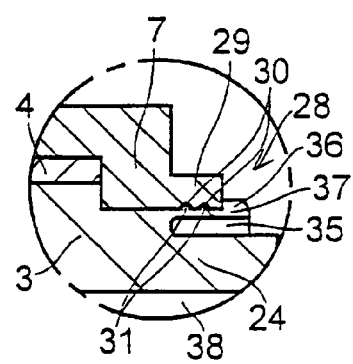
Figure 5A:
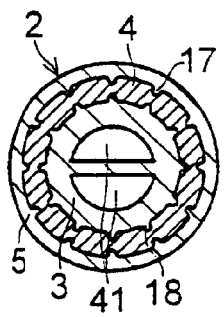
FIGS. 5A to 5D are explanatory diagrams of modifications of the embodiment shown in FIGS. 3A and 3B.
Figure 5B:
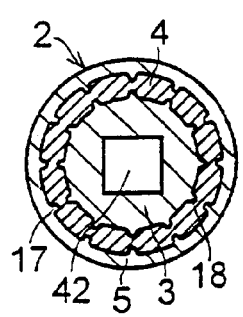
Figure 5C:
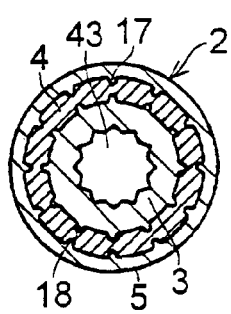
Figure 5D:
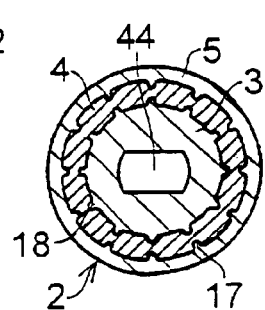

In addition, instead of the labyrinths 21 and 22 shown in FIGS. 3B and 4A, a labyrinth 28 such as the one shown in FIG. 4B may be used. The labyrinth 28 is formed by a plurality of annular grooves 30 provided in the inner peripheral surface of a tubular portion 29 formed integrally on the bottom portion 7 as well as a plurality of annular projections 31 which are formed integrally on the outer peripheral surface of the small-diameter portion 24 of the shaft 3 and are fitted in the grooves 30. It should be noted that, in the example shown in FIG. 4B, an annular recess 35 extending along the direction of the axis A is formed in the small-diameter portion 24 of the shaft 3, and a projection 36 projecting in the radial direction is formed integrally on the outer peripheral surface of the small-diameter portion 24 of the shaft 3. An annular portion 37 where the annular projection 31 is formed in the small-diameter portion 24 is snap-fitted to the tubular portion 29 with resiliency so as to be relatively slidable about the axis A in the R directions with respect to the tubular portion 29.

By using the labyrinths 21 and 22 or 28 such as those shown in FIGS. 4A and 4B, it is possible to easily prevent the leakage of the silicone-based unvulcanized rubber 4. In addition, by using the snap-fit type fitting as shown in FIG. 4B, it is possible to more easily prevent the leakage of the silicone-based unvulcanized rubber 4 over an extended period.

Although the solid shaft 3 is used in the dampers 1 shown in FIGS. 1A and 1B as well as 2A and 2B, a hollow shaft 3 may be alternatively used, as shown in FIGS. 3A and 3B. The arrangement provided is such that the shaft or the like with a hexagonal cross-sectional shape of a hinge mechanism is fitted in a hollow portion 38 with a hexagonal cross-sectional shape of the shaft 3 so as not to idle by slipping about the axis A in the R directions with respect to the shaft 3. As the shape of the hollow portion for preventing such idling, instead of the hollow portion 38 with the hexagonal cross-sectional shape, it is possible to use an overlapping pair of hollow portions 41 each having a semicircular cross-sectional shape, a hollow portion 42 having a square cross-sectional shape, a hollow portion 43 having a starlike cross-sectional shape, or a hollow portion 44 having a rectangular cross-sectional shape. The shaft or the like of the hinge mechanism having a cross-sectional shape complementary to each of these hollow portions 41 to 44 is adapted to be fitted in each of these hollow portions 41 to 44.

Figure 6:
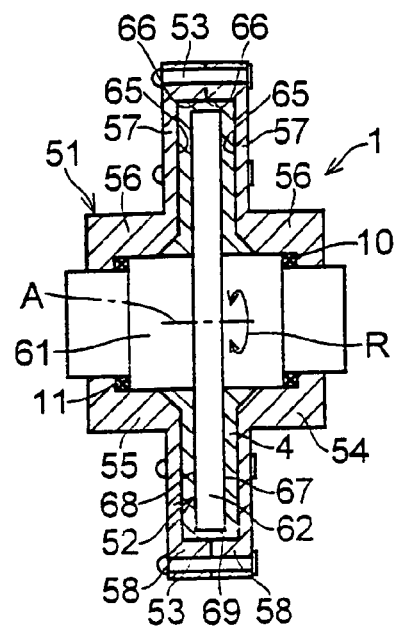
FIG. 6 is an explanatory diagram of a further preferred embodiment of the invention.
Figure 7:
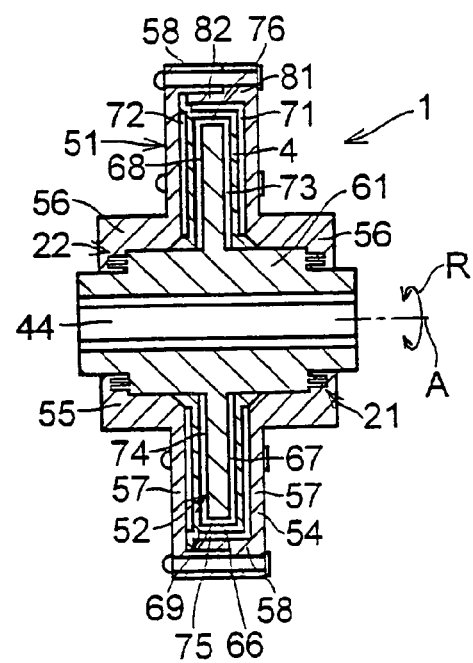
FIG. 7 is an explanatory diagram of a still further preferred embodiment of the invention.
Figure 8:
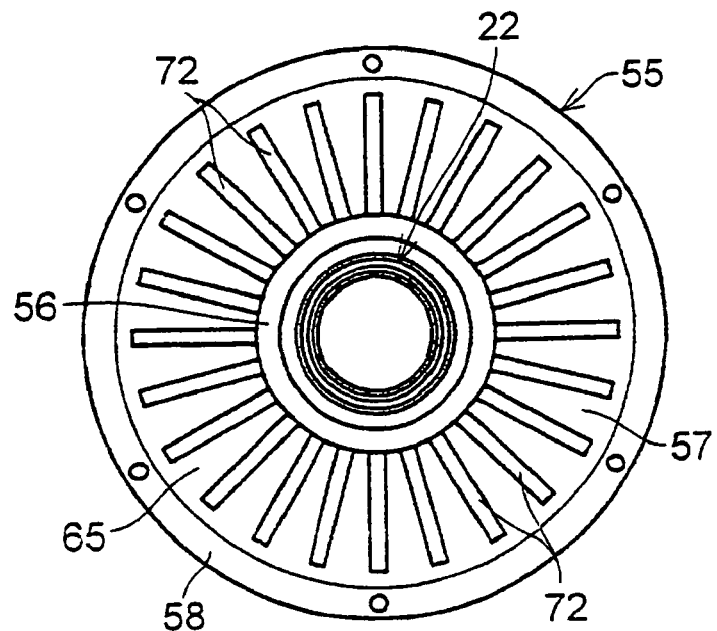
FIG. 8 is a right-hand side elevational view of one half member of the embodiment shown in FIG. 7.
Figure 9:
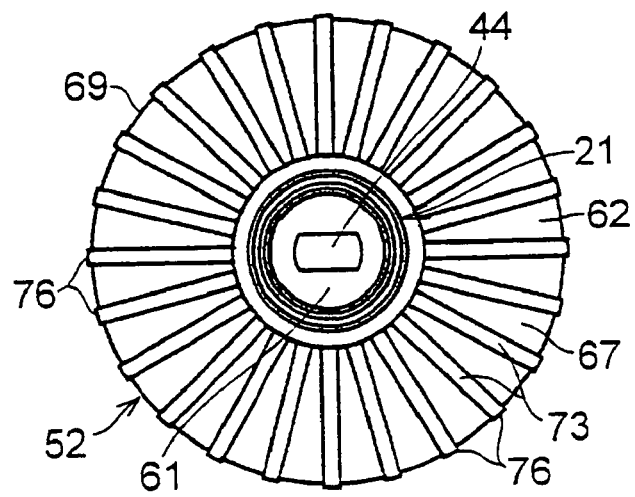
FIG. 9 is a left-hand side elevational view of a relatively rotating member of the embodiment shown in FIG. 7.
Figure 10:
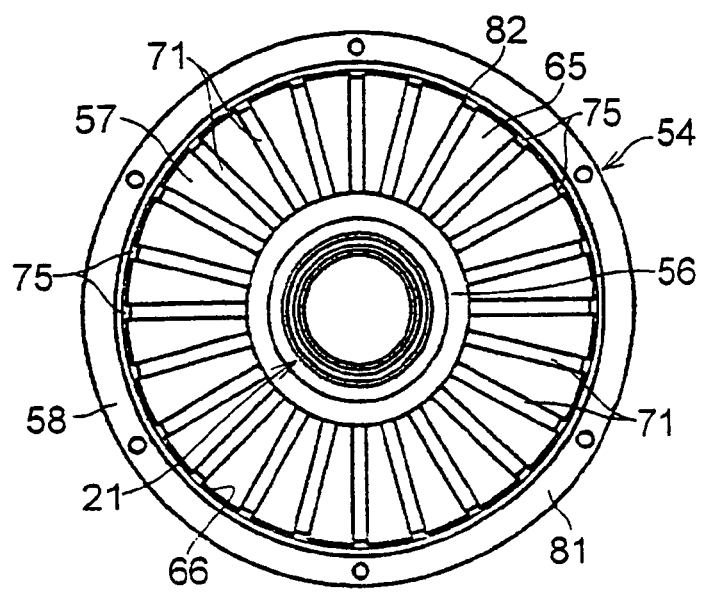
FIG. 10 is a left-hand side elevational view of the other half member of the embodiment shown in FIG. 7.

In addition, although the dampers 1 shown in FIGS. 1A and 1B as well as 2A and 2B are examples in which the housing 2 and the shaft 3 which are relatively long in the direction of the axis A are used as the pair of members, the damper 1 may be constructed by using as the pair of members a housing 51 jutting out in the radial direction and a relatively rotating member 52 disposed inside the housing 51 in such a manner as to be relatively rotatable about the axis A in the directions R, as shown in FIG. 6. In the damper 1 shown in FIG. 6, the housing 51 consists of a pair of half members 54 and 55 secured to each other by means of rivets 53 or the like, and each of the half members 54 and 55 has a small-diameter inner peripheral-side hollow cylindrical portion 56, an annular plate portion 57 formed integrally on the hollow cylindrical portion 56, and a large-diameter outer peripheral-side hollow cylindrical portion 58 formed integrally on the annular plate portion 57. The relatively rotating member 52 has a hollow shaft portion 61 and an annular plate portion 62 formed integrally on the shaft portion 61. In this embodiment, the silicone-based unvulcanized rubber 4 is interposed in an annular gap between the housing 51 and the relatively rotating member 52.

In the damper 1 shown in FIG. 6 as well, deformation is caused in the silicone-based unvulcanized rubber 4 by the relative rotation of the relatively rotating member 52 in the R directions with respect to the housing 51 during the opening or closing of the cover or the like of the apparatus, and the rotational energy of the cover or the like is absorbed by the deformation of the silicone-based unvulcanized rubber 4, thereby making it possible to prevent a shock from occurring at the time of the opening or closing. Since the damping function is thus obtained by the silicone-based unvulcanized rubber 4, there is no possibility of wear, and a large damping force can be easily obtained even if the damper 1 is lightweight and compact.

In the damper 1 shown in FIG. 6, an inner annular surface 65 of the annular plate portion 57 and an inner cylindrical surface 66 of the hollow cylindrical portion 58, as well as obverse and reverse annular surfaces 67 and 68 of the annular plate portion 62 and an outer peripheral cylindrical surface 69 of the annular plate portion 62, which are in contact with the silicone-based unvulcanized rubber 4, are formed as smooth surfaces. Alternatively, however, as shown in FIGS. 7 to 10, these surfaces 65, 66, 67, 68, and 69 may be formed as uneven surfaces by integrally forming thereon projections extending in directions intersecting the direction of relative rotation of the relatively rotating member 52 about the axis A in the R directions with respect to the housing 51, i.e., in directions perpendicular to the direction of relative rotation in this embodiment, thereby preventing the slippage of the silicone-based unvulcanized rubber 4 with respect to the housing 51 and the relatively rotating member 52 in that relative rotation in the R directions.

Namely, in the damper 1 shown in FIGS. 7 to 10, on the annular surfaces 65 of the annular plate portions 57 and on the obverse and reverse annular surfaces 67 and 68 of the annular plate portion 62 respectively opposing the annular surfaces 65, a plurality of projections 71, 72, 73, and 74 extending in the radial directions of those annular surfaces 65, 67, and 68 are integrally formed. The respective annular surfaces 65, 67, and 68 are thus formed as uneven surfaces in contact with the silicone-based unvulcanized rubber 4. Similarly, a plurality of projections 75 and 76 extending substantially parallel to a center line A of the cylindrical surfaces 66 and 69 are integrally formed on the cylindrical surface 66 of the hollow cylindrical portion 58 of each half member 54 as well as the outer peripheral cylindrical surface 69 of the annular plate portion 62 opposing the cylindrical surface 66. Thus the respective cylindrical surfaces 66 and 69 are formed as uneven surfaces in contact with the silicone-based unvulcanized rubber 4.

In the damper 1 shown in FIGS. 7 to 10 as well, in the same way as the damper 1 shown in FIG. 6, deformation is caused in the silicone-based unvulcanized rubber 4 by the relative rotation of the relatively rotating member 52 about the axis A in the R directions with respect to the housing 51, and this rotational energy can be absorbed by the deformation of the silicone-based unvulcanized rubber 4. Moreover, since the respective projections 71 to 76 firmly grip the silicone-based unvulcanized rubber 4 in the vicinities of the projections 71 to 76 in that relative rotation, it is possible to prevent a situation in which the silicone-based unvulcanized rubber 4 slips with respect to the relatively rotating member 52 and the housing 51, thereby making it possible to reliably cause plastic deformation in the silicone-based unvulcanized rubber 4.

It should be noted that, in the damper 1 shown in FIGS. 7 to 10, the hollow cylindrical portion 58 of the half member 54 consists of a hollow cylindrical portion 81 with a large thickness and a hollow cylindrical portion 82 with a small thickness formed integrally on the hollow cylindrical portion 81. The hollow cylindrical portion 82 has its outer peripheral surface abutting against the cylindrical surface 66 of the hollow cylindrical portion 58 of the half member 55, and is interiorly fitted to the hollow cylindrical 58 of that half member 55. In addition, the above-mentioned labyrinths 21 and 22 are provided instead of the seal rings 10 and 11.

Figure 11:
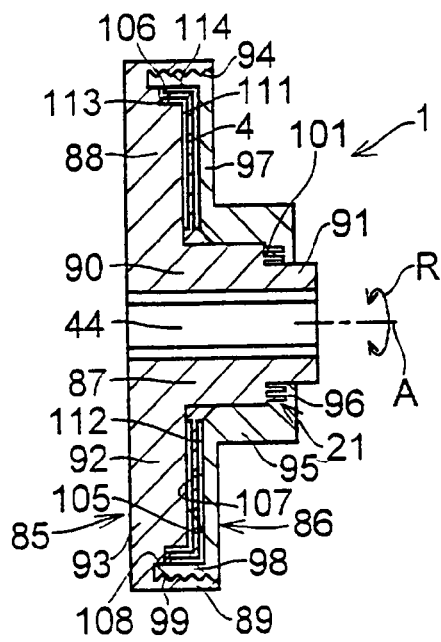
FIG. 11 is an explanatory diagram of a further preferred embodiment of the invention.
Figure 12:
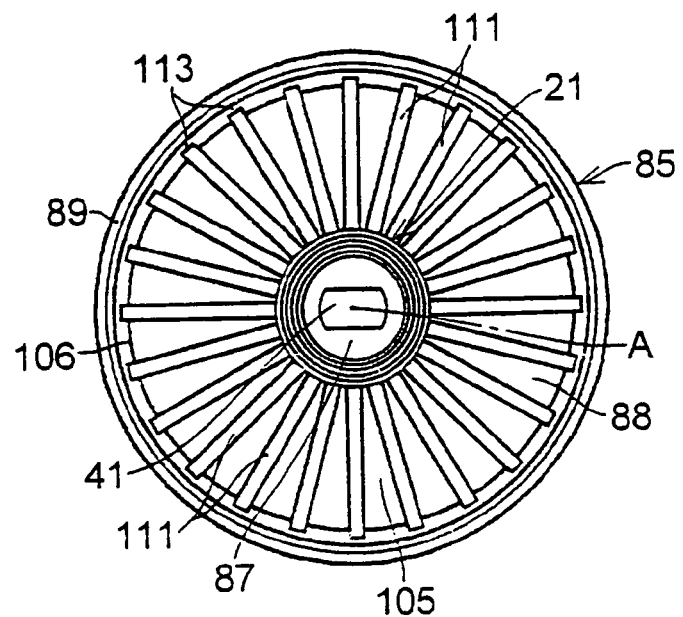
FIG. 12 is a right-hand side elevational view of a housing body of the embodiment shown in FIG. 11.
Figure 13:
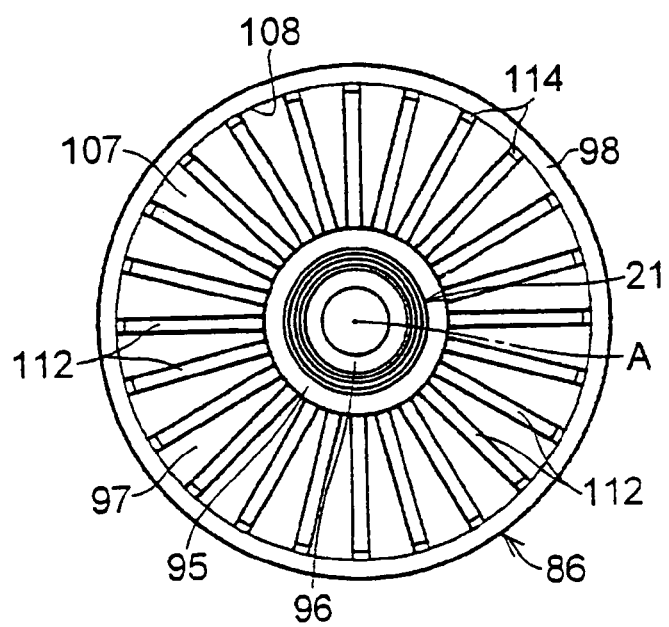
FIG. 13 is a left-hand side elevational view of a cover member of the embodiment shown in FIG. 11.

Further, in the present invention, the damper 1 may be constructed as shown in FIGS. 11 to 13. The damper 1 shown in FIGS. 11 to 13 has the silicone-based unvulcanized rubber 4 interposed between a housing body 85 and a cover member 86 which serve as the pair of members disposed in such a manner as to be relatively rotatable about the axis A in the R directions with respect to each other.

The housing body 85 includes a hollow cylindrical shaft portion 87, an annular plate portion 88 formed integrally on the shaft portion 87, and a hollow cylindrical portion 89 formed integrally on the annular plate portion 88. The shaft portion 87 has a large-diameter shaft portion 90 and a small-diameter shaft portion 91 formed integrally on the large-diameter shaft portion 90. The annular plate portion 88 has a thick plate portion 92 and a thin plate portion 93 which is formed integrally on the thick plate portion 92 and on which the hollow cylindrical portion 89 is integrally formed. An inner peripheral surface 94 of the hollow cylindrical portion 89 is formed as an uneven surface for fitting and for a labyrinth.

The cover member 86 includes a hollow cylindrical portion 95, a collar portion 96 formed integrally on the hollow cylindrical portion 95, an annular plate portion 97 formed integrally on the hollow cylindrical portion 95, and a hollow cylindrical portion 98 formed integrally on the annular plate portion 97. An outer peripheral surface 99 of the hollow cylindrical portion 98 is formed as an uneven surface which is complementary to the uneven surface of the inner peripheral surface 94 of the hollow cylindrical portion 89. The aforementioned labyrinth 21 is formed in the collar portion 96 and a stepped portion 101 between the large-diameter shaft portion 90 and the small-diameter shaft portion 91. The housing body 85 and the cover member 86 are fitted to each other at the inner peripheral surface 94 of the hollow cylindrical portion 89 and the outer peripheral surface 99 of the hollow cylindrical portion 98 in such a manner as to be relatively rotatable about the axis A in the R directions with respect to each other. The silicone-based unvulcanized rubber 4 is disposed by being filled in a gap between, on the one hand, an inner annular surface 105 and an outer peripheral-side cylindrical surface 106 of the thick plate portion 92 and, on the other hand, an inner annular surface 107 of the annular plate portion 97 and an inner cylindrical surface 108 of the hollow cylindrical 98.

In the damper 1 shown in FIGS. 11 to 13 as well, on the annular surfaces 105 and the cylindrical surface 106 of the thick plate portion 92 and on the annular surface 107 of the annular plate portion 97 and the cylindrical surface 108 of the hollow cylindrical portion 98 respectively opposing the annular surface 105 and the cylindrical surface 106, a plurality of projections 111 and 112 extending in the radial directions of those annular surfaces 105 and 107, as well as a plurality of projections 113 and 114 extending substantially parallel to the center line A of the cylindrical surfaces 106 and 108, are respectively formed integrally. The respective annular surfaces 105 and 107 and cylindrical surfaces 106 and 108 are thus formed as uneven surfaces in contact with the silicone-based unvulcanized rubber 4.

Figure 14:
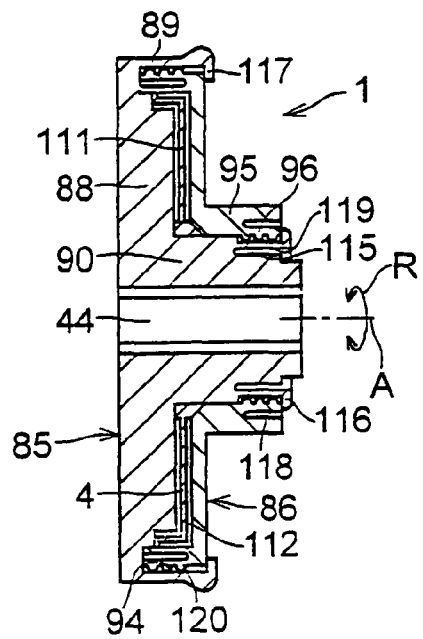
FIG. 14 is an explanatory diagram of a further preferred embodiment of the invention.
Figure 15:
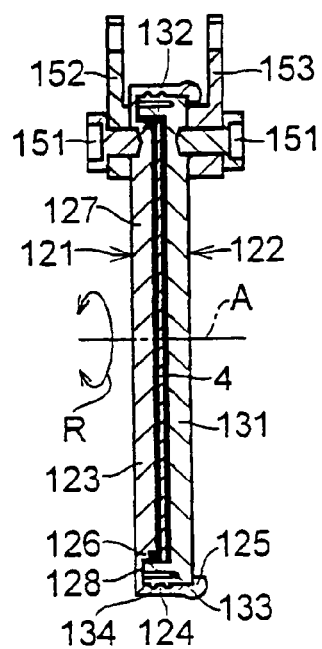
FIG. 15 is an explanatory diagram of a further preferred embodiment of the invention.
Figure 16:
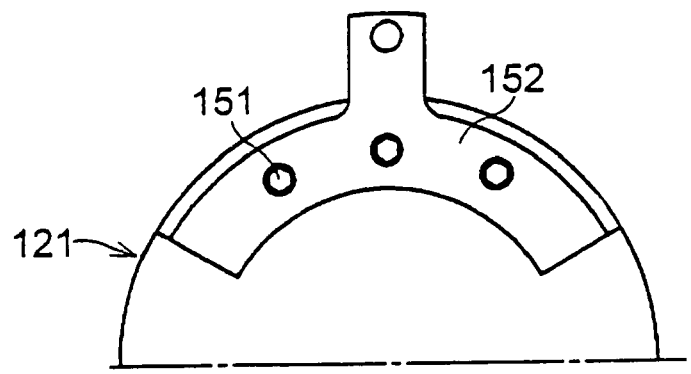
FIG. 16 is a left-hand side elevational view of a portion of the embodiment shown in FIG. 15.
Figure 17:
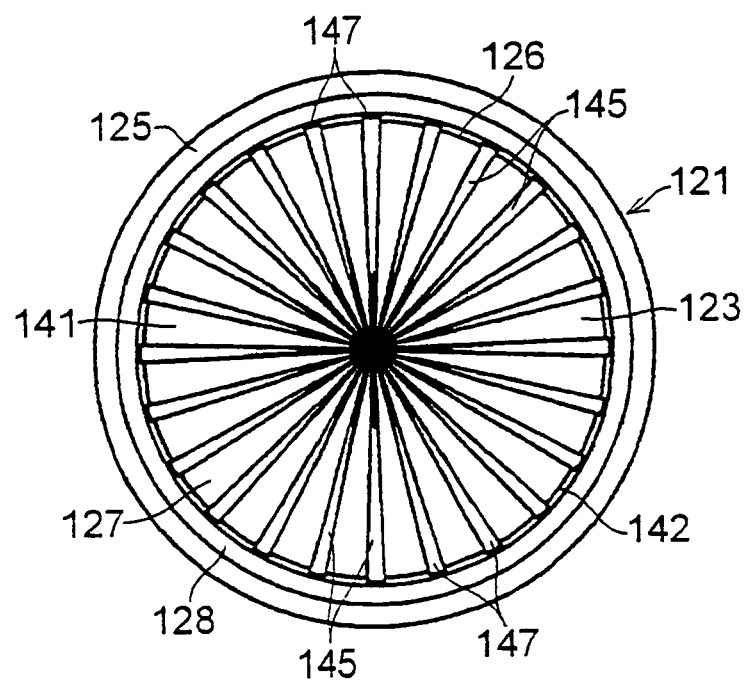
FIG. 17 is a right-hand side elevational view of one disk-like member of the embodiment shown in FIG. 15.
Figure 18:
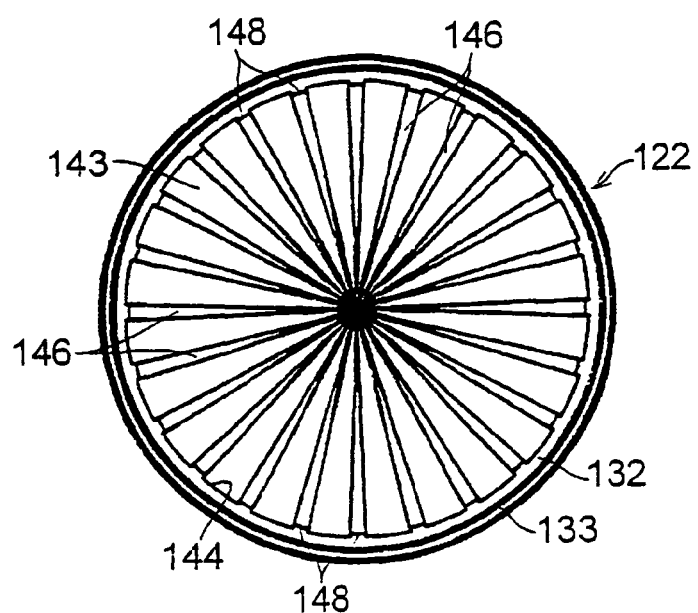
FIG. 18 is a left-hand side elevational view of the other disk-like member of the embodiment shown in FIG. 15.
Figure 19:
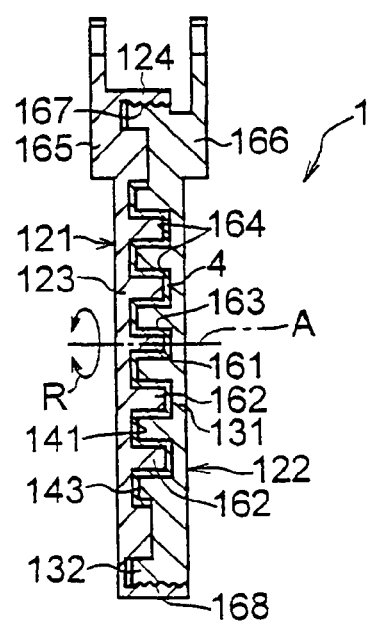
FIG. 19 is an explanatory diagram of a further preferred embodiment of the invention.
Figure 22:
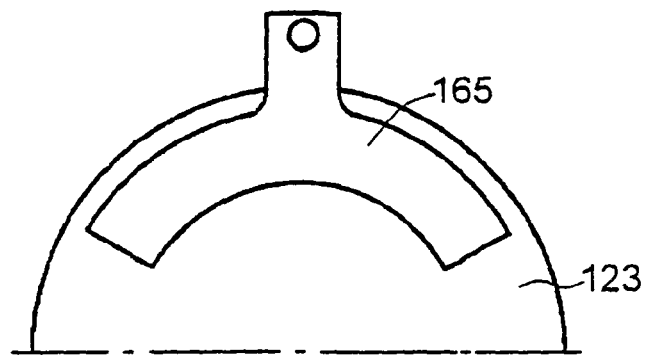
FIG. 22 is a left-hand side elevational view of a portion of the embodiment shown in FIG. 19.

In the damper 1 shown in FIGS. 11 to 13, the housing body 85 and the cover member 86 are fitted to each other at the inner peripheral surface 94 of the hollow cylindrical portion 89 and the outer peripheral surface 99 of the hollow cylindrical portion 98. Alternatively, however, an arrangement may be provided as shown in FIG. 14. Namely, an annular groove 115 extending along the direction of the axis A is formed in the large-diameter shaft portion 90, and an annular collar portion 116 is formed integrally thereon. Further, an annular collar portion 117 is formed integrally on the hollow cylindrical portion 89, and the inner peripheral surface 94 of the hollow cylindrical portion 89 is formed to be smooth. Meanwhile, an annular groove 118 extending along the direction of the axis A is formed in the hollow cylindrical portion 95, and an annular inner peripheral surface 119 of the collar portion 96 is formed as an uneven surface, while an annular groove 120 extending along the direction of the axis A is formed in the hollow cylindrical portion 98. Thus, the cover member 86 is fitted to the housing body 85 in a snap-fitting manner by means of the collar portions 116 and 117 in such a manner as to be relatively rotatable about the axis A in the R directions with respect to each other.

In the dampers 1 shown in FIGS. 11 to 13 and FIG. 14 as well, deformation is caused in the silicone-based unvulcanized rubber 4 by the relative rotation of the housing body 85 in the R directions with respect to the cover member 86, and this rotational energy can be absorbed by the deformation of the silicone-based unvulcanized rubber 4. Moreover, since the respective projections 111 to 114 firmly grip the silicone-based unvulcanized rubber 4 in the vicinities of the projections 111 to 114 in that relative rotation, it is possible to prevent a situation in which the silicone-based unvulcanized rubber 4 slips with respect to the housing body 85 and the cover member 86, thereby making it possible to reliably cause plastic deformation in the silicone-based unvulcanized rubber 4.

Further, instead of the above-described construction, the damper 1 may be constructed as shown in FIGS. 15 to 18. The damper 1 shown in FIGS. 15 to 18 has the silicone-based unvulcanized rubber 4 interposed between a pair of disk-like members 121 and 122 which serve as the pair of members disposed in such a manner as to be relatively rotatable about the axis A in the R directions with respect to each other.

The disk-like member 121 includes a disk-like portion 123, a hollow cylindrical portion 124 formed integrally on an outer edge of the cylindrical portion 123, and an annular collar portion 125 formed integrally on one end face of the hollow cylindrical portion 124. The disk-like portion 123 includes a thick disk-like portion 127 having a double stepped portion 126 at its outer edge and a thin annular portion 128 which is formed integrally on the outer edge of the disk-like portion 127 and on which the hollow cylindrical portion 124 is integrally formed.

The disk-like member 122 includes a disk-like portion 131 and a hollow cylindrical portion 132 formed integrally on an outer edge of the cylindrical portion 131. An annular groove 133 extending parallel to the axis A is formed in the hollow cylindrical portion 132, and a plurality of annular projections 134 for fitting in annular grooves formed in an inner peripheral surface of the hollow cylindrical portion 124 are formed integrally on an outer peripheral surface of the hollow cylindrical portion 132. Thus, the disk-like member 122 is fitted to the disk-like member 121 in a snap-fitting manner by means of the collar portion 125 in such a manner as to be relatively rotatable about the axis A in the R directions.

In addition, in the damper 1 shown in FIGS. 15 to 18, on an inner disk-like surface 141 of the disk-like portion 123 and a cylindrical surface 142 defining the stepped portion 126 and on an inner disk-like surface 143 of the disk-like portion 131 and an inner cylindrical surface 144 of the cylindrical portion 132 respectively opposing the disk-like surface 141 and the cylindrical surface 142, a plurality of projections 145 and 146 extending in the radial directions from the center A of those disk-like surfaces 141 and 143, as well as a plurality of projections 147 and 148 extending substantially parallel to the center line A of the cylindrical surfaces 142 and 144, are respectively formed integrally. The respective disk-like surfaces 141 and 143 and cylindrical surfaces 142 and 144 are thus formed as uneven surfaces in contact with the silicone-based unvulcanized rubber 4.

The damper 1 shown in FIGS. 15 to 18 further includes mounting members 152 and 153 which are respectively secured to the disk-like members 121 and 122 by means of screws 151. The disk-like member 121 is fixed to, for example, a frame member or the like of an apparatus by means of the mounting member 152, while the disk-like member 122 is connected by means of the mounting member 152 to a member such as a shaft for dampening the rotation of such as the apparatus.

In the damper 1 shown in FIGS. 15 to 18 as well, deformation is caused in the silicone-based unvulcanized rubber 4, which is filled in the gap between the disk-like portion 123 and the disk-like portion 131, by the relative rotation of the disk-like member 121 about the axis A in the R directions with respect to the disk-like member 122, and this rotational energy can be absorbed by the deformation of the silicone-based unvulcanized rubber 4. Moreover, since the respective projections 145 to 148 firmly grip the silicone-based unvulcanized rubber 4 in the vicinities of the projections 145 to 148 in that relative rotation, it is possible to prevent a situation in which the silicone-based unvulcanized rubber 4 slips with respect to the disk-like members 121 and 122, thereby making it possible to reliably cause plastic deformation in the silicone-based unvulcanized rubber 4.

Although, in the damper 1 shown in FIGS. 15 to 18, the gap where the silicone-based unvulcanized rubber 4 is filled extends straightly in the radial directions, the damper 1 may be alternatively constructed such that the gap where the silicone-based unvulcanized rubber 4 is filled extends in a zigzag manner in the radial directions, as shown in FIGS. 19 to 22.

Namely, in the damper 1 shown in FIGS. 19 to 22, the disk-like member 121 integrally has on the disk-like surface 141 of the disk-like portion 123 a central circular projection 161 and a plurality of annular projections 162 arranged concentrically with the central circular projection 161 as the center. Meanwhile, the disk-like member 122 has on the disk-like surface 143 of the disk-like portion 131 a central circular groove 163 in which the central circular projection 161 is disposed with a gap therebetween, as well as a plurality of annular grooves 164 in which the respective annular projections 162 are disposed with the gap therebetween and which are arranged concentrically with the central circular groove 163 as the center. A zigzag gap is formed in the radial direction between the disk-like member 121 and the disk-like member 122 by the central circular projection 161 and the annular projections 162 as well as by the central circular groove 163 and the annular grooves 164, and the silicone-based unvulcanized rubber 4 is filled in such a gap.

In the damper 1 shown in FIGS. 19 to 22 as well, deformation is caused in the silicone-based unvulcanized rubber 4, which is filled in the gap between the disk-like portion 123 and the disk-like portion 131, by the relative rotation of the disk-like member 121 about the axis A in the R directions with respect to the disk-like member 122, and this rotational energy can be absorbed by the deformation of the silicone-based unvulcanized rubber 4. Moreover, since the zigzag gap is formed between the disk-like member 121 and the disk-like member 122, the area of contact between, on the one hand, the silicone-based unvulcanized rubber 4 and, on the other hand, the disk-like portion 123 and the disk-like portion 131 increases, so that a large damping force can be obtained even if the damper 1 is made compact.

In the damper 1 shown in FIGS. 19 to 22, mounting portions 165 and 166 corresponding to the mounting members 152 and 153 are respectively formed integrally on the disk-like portion 123 and the disk-like portion 131, and the disk-like member 121 and the disk-like member 122 are fitted to each other at an inner uneven cylindrical surface 167 of the hollow cylindrical portion 124 and an outer uneven cylindrical surface 168 of the hollow cylindrical portion 132 in such a manner as to be relatively rotatable about the axis A in the R directions with respect to each other.

Figure 23:
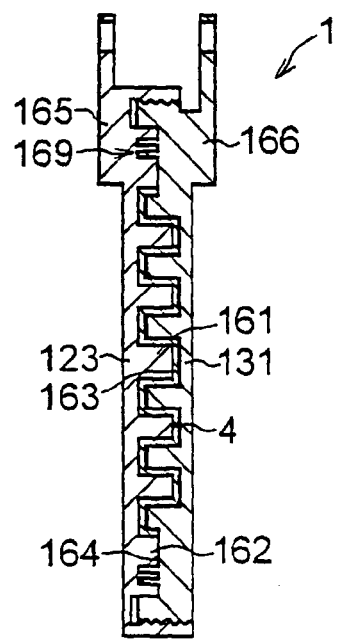
FIG. 23 is an explanatory diagram of a further preferred embodiment of the invention.

In the damper 1 shown in FIGS. 19 to 22, a labyrinth 169 similar to the labyrinths 21 and 22 may be provided on outer sides of the outermost peripheral annular projection 162 and the outermost peripheral annular groove 164, as shown in FIG. 23, so as to prevent the leakage of the silicone-based unvulcanized rubber 4.

In the dampers 1 shown in FIGS. 19 to 22 and FIG. 23, the disk-like surface 141 including the cylindrical side surface of the central circular projection 161 and the cylindrical inner and outer peripheral surfaces and top surfaces of the annular projections 162, as well as the disk-like surface 143 including the cylindrical side surface of the central circular groove 163 and the cylindrical inner and outer peripheral surfaces and bottom surfaces of the annular grooves 164, are respectively formed as smooth surfaces. Alternatively, however, as shown in FIGS. 24 to 26, a plurality of projections 171 and 172 which extend substantially parallel to the center line A on the cylindrical side surface of the central circular projection 161, the cylindrical inner and outer peripheral surfaces of the annular projections 162, the cylindrical side surface of the central circular groove 163, and the cylindrical inner and outer peripheral surfaces of the annular grooves 164, and which on the other surfaces extend in the radial directions of the disk-like surfaces 141 and 143, i.e., extend radially and respectively continue, may be integrally formed on these surfaces.

Figure 24:
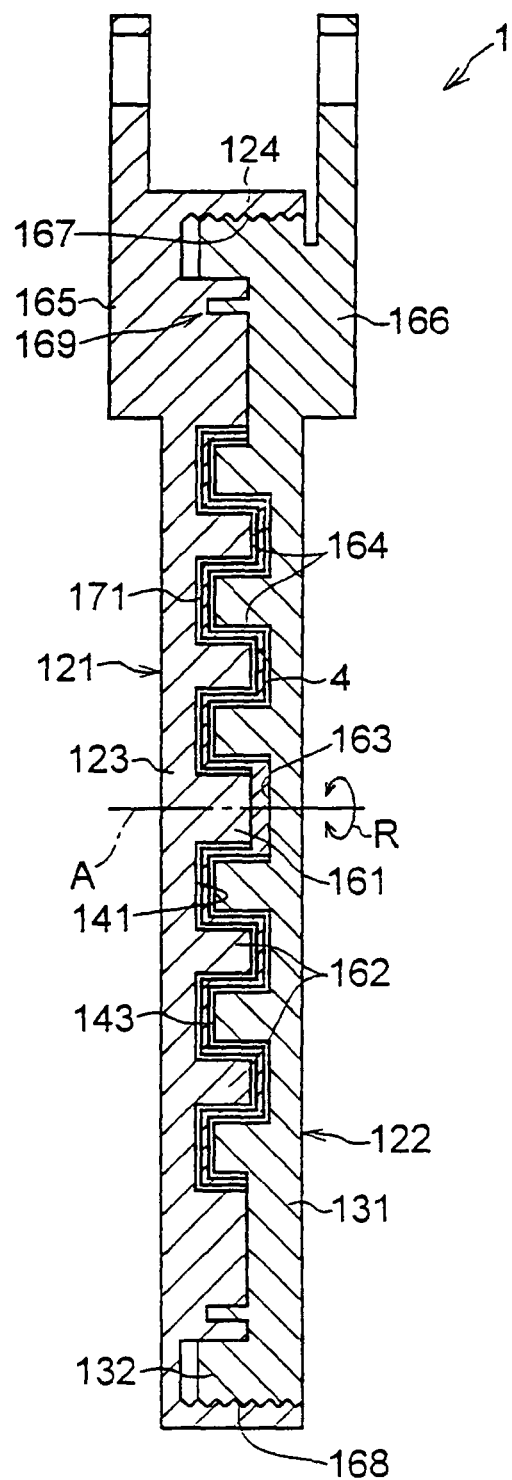
FIG. 24 is an explanatory diagram of a further preferred embodiment of the invention.

In the damper 1 shown in FIGS. 24 to 26 as well, deformation is caused in the silicone-based unvulcanized rubber 4, which is filled in the gap between the disk-like portion 123 and the disk-like portion 131, by the relative rotation of the disk-like member 121 about the axis A in the R directions with respect to the disk-like member 122, and this rotational energy can be absorbed by the deformation of the silicone-based unvulcanized rubber 4. Moreover, since the respective projections 171 and 172 firmly grip the silicone-based unvulcanized rubber 4 in the vicinities of the projections 171 and 172 in that relative rotation, it is possible to prevent a situation in which the silicone-based unvulcanized rubber 4 slips with respect to the disk-like members 121 and 122, thereby making it possible to reliably cause plastic deformation in the silicone-based unvulcanized rubber 4. Furthermore, since the zigzag gap is formed between the disk-like member 121 and the disk-like member 122, the area of contact between, on the one hand, the silicone-based unvulcanized rubber 4 and, on the other hand, the disk-like portion 123 and the disk-like portion 131 increases, so that a large damping force can be obtained even if the damper 1 is made compact.

Figure 27:
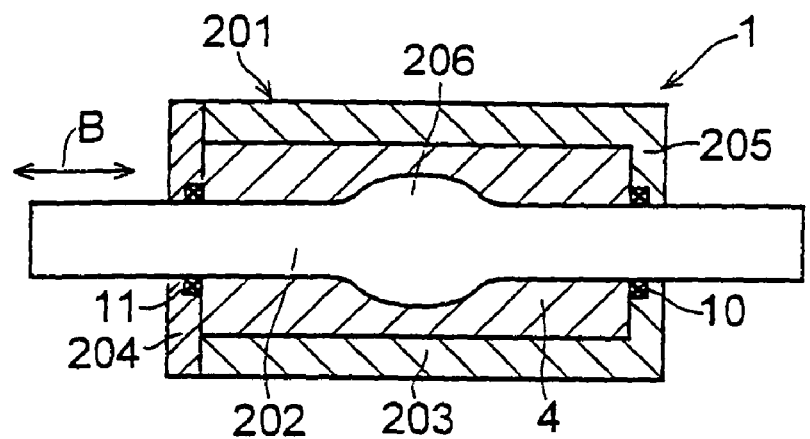
FIG. 27 is an explanatory diagram of a further preferred embodiment of the invention.
Figure 28:
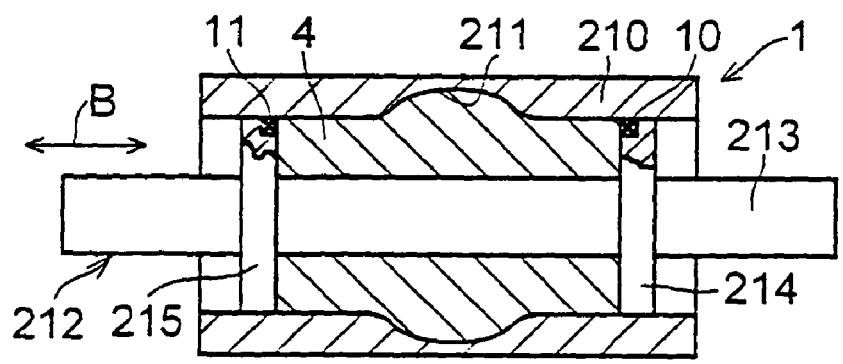
FIG. 28 is an explanatory diagram of a further preferred embodiment of the invention.
Figure 29:
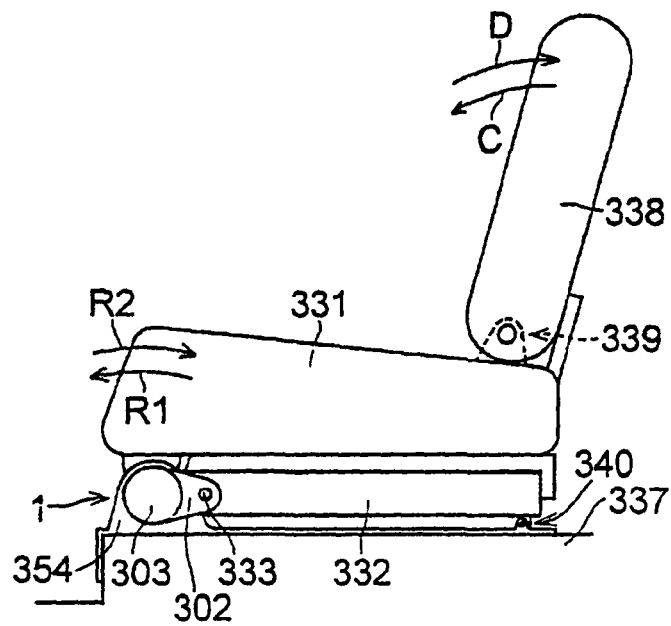
FIG. 29 is an explanatory diagram of an automobile seat in accordance with a further preferred embodiment of the invention.
Figure 30:
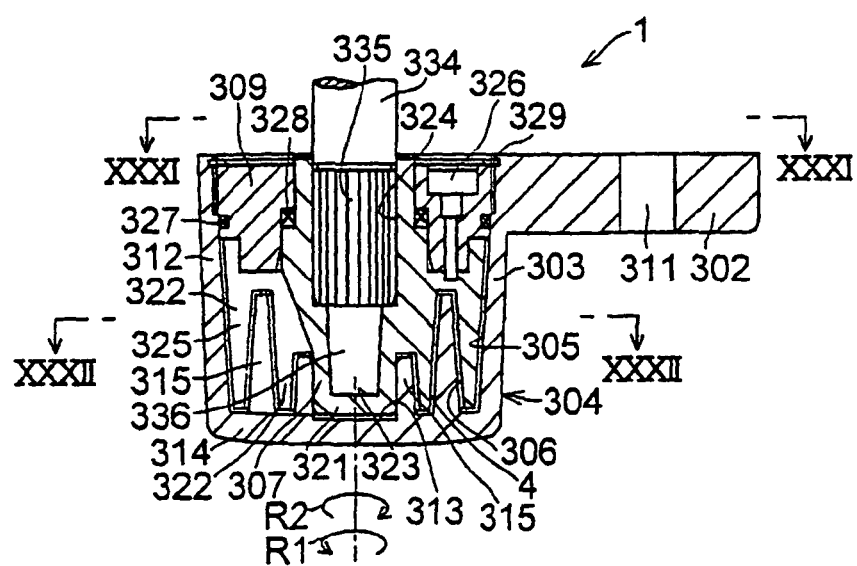
FIG. 30 is an explanatory cross-sectional view of the further embodiment shown in FIG. 29.

Although the respective dampers 1 in the above-described embodiments are capable of absorbing the rotational energy and damping the rotation as desired, the present invention is also applicable to an arrangement which linearly moves, as shown in FIGS. 27 and 28, and its linearly moving energy can be satisfactorily absorbed, thereby making it possible to damp the linear motion as desired.

The damper 1 shown in FIG. 27 has the silicone-based unvulcanized rubber 4 interposed between a cylinder 201 and a cylindrical rod 202 which serve as the pair of members disposed in such a manner as to be relatively movable, or linearly movable in directions B in this embodiment, with respect to each other. This damper 1 is adapted to absorb the relative linearly moving energy in the B directions between the cylinder 201 and the cylindrical rod 202 through the deformation of the silicone-based unvulcanized rubber 4.

The cylinder 201 has a hollow cylindrical portion 203 with a bottom and a cover portion 204 secured to one end face of the cylindrical portion 203. The rod 202 is passed through a bottom portion 205 of the hollow cylindrical portion 203 and the cover portion 204 in such a manner as to be linearly movable in the B direction, and projects outside the cylinder 201. The rod 202 has an enlarged portion 206 inside the cylinder 201, and the seal rings 10 and 11 are respectively fitted between the bottom portion 205 and the rod 202 and between the cover portion 204 and the rod 202.

In the damper 1 which is shown in FIG. 27 and in which the silicone-based unvulcanized rubber 4 is closely filled in a space (gap) between the cylinder 201 and the rod 202, deformation (plastic deformation) is caused in the silicone-based unvulcanized rubber 4 by the enlarged portion 206 in the relative linear motion of the rod 202 in the B directions with respect to the cylinder 201, and the linearly moving energy in the B directions is absorbed by this deformation of the silicone-based unvulcanized rubber 4.

Although, in the damper 1 shown in FIG. 27, the silicone-based unvulcanized rubber 4 is deformed by causing the silicone-based unvulcanized rubber 4 to undergo plastic flow by the enlarged portion 206, the silicone-based unvulcanized rubber 4 may be alternatively deformed by causing the silicone-based unvulcanized rubber 4 to undergo plastic flow by a recessed portion 211 provided in a hollow cylindrical member 210, as shown in FIG. 28.

The damper 1 shown in FIG. 28 has the silicone-based unvulcanized rubber 4 interposed between the hollow cylinder 210 and a linearly moving member 212 which serve as the pair of members disposed in such a manner as to be relatively linearly movable in the directions B with respect to each other. This damper 1 is adapted to absorb the relative linearly moving energy in the B directions between the hollow cylindrical member 210 and the linearly moving member 212 through the deformation of the silicone-based unvulcanized rubber 4.

The hollow cylindrical member 210 has the recessed portion 211 in its inner cylindrical surface, while the linearly moving member 212 has a cylindrical rod 213 and a pair of disk-like collars 214 and 215 which are secured to the rod 213 and are in contact with the inner cylindrical surface of the hollow cylindrical member 210 at their annular outer edges in such a manner as to be slidable in the B directions. The seal rings 10 and 11 are respectively fitted between the collar 214 and the hollow cylindrical member 210 and between the collar 215 and the hollow cylindrical member 210.

Also in the damper 1 which is shown in FIG. 28 and in which the silicone-based unvulcanized rubber 4 is closely filled in the space (gap) between the hollow cylindrical member 210 and the linearly moving member 212, deformation (plastic deformation) is caused in the silicone-based unvulcanized rubber 4 by the recessed portion 211 in the relative linear motion of the linearly moving member 212 in the B directions with respect to the hollow cylindrical member 210, and the linearly moving energy in the B directions is absorbed by this deformation of the silicone-based unvulcanized rubber 4.

It should be noted that the damper 1 may be constructed by providing, instead of the recessed portion 211, the enlarged portion 206 such as the one shown in FIG. 27 on the inner cylindrical surface of the hollow cylindrical member 210 shown in FIG. 28, or the damper 1 may be constructed by providing, instead of the enlarged portion 206, the recessed portion 211 such as the one shown in FIG. 28 on the surface of the rod 202 shown in FIG. 27.

Next, an example of a damper suitable for use in an automobile seat and an example of an automobile seat using such a damper are shown in FIGS. 29 to 32. In FIGS. 29 to 32, the damper 1 for an automobile seat in this embodiment has a housing 304 serving as one member and a gap forming member 307 and a cover member 309 serving as other members. The housing 304 integrally has an arm portion 302 and a housing body 303. The gap forming member 307 is accommodated in the housing body 303 in such a manner as to be rotatable in R1 and R2 directions, and forms a gap 306 in cooperation with an inner surface 305 of the housing body 303. The silicone-based unvulcanized rubber 4 is disposed in the gap 306, and the cover member 309 is secured to the gap forming member 307.

A through hole 311 for connection is formed in the arm portion 302, and the housing body 303 integrally has a hollow cylindrical member 312, a closure portion 314 which closes one end face of the hollow cylindrical member 312 and in an inner surface of which a central recessed portion 313 is formed, and a plurality of concentric arcuate projections 315 provided on an inner surface of the closure portion 314 with the central recessed portion 313 as the center.

The gap forming member 307 has a central projection 321 fitted in the central recessed portion 313 in such a manner as to be rotatable in the R1 and R2 directions, a plurality of concentric hollow cylindrical projections 322 on the inner sides of which the arcuate projections 315 of the housing body 303 are disposed with the gap 306 therebetween and which are provided with the central projection 321 as the center, a central recessed portion 323 formed in the central projection 321, and a hole 324 communicating with the central recessed portion 323. In the hole 324, serrations extending along the axial direction are formed on the gap forming member 307. A plurality of slits 325 which extend in the radial directions, communicate with the gap 306, and are arranged at equiangular intervals in the circumferential direction in this embodiment are formed in the gap forming member 307.

The silicone-based unvulcanized rubber 4 is disposed in the housing body 303 by being filled in the gap 306 in close contact with the housing body 303 and the gap forming member 307.

The cover member 309 is secured to the gap forming member 307 by screws 326, and seal members (O-rings) 327 and 328 are respectively fitted between the cover member 309 and the gap forming member 307 and between the cover member 309 and the hollow cylindrical member 312. In a case where the silicone-based unvulcanized rubber 4 does not have much fluidity, the seal members 327 and 328 may be omitted. It should be noted that the prevention of the cover member 309 from coming off the hollow cylindrical member 312 is effected by a ring 329 such as an E-ring fitted to the hollow cylindrical member 312.

To use the damper 1 of this embodiment shown in FIGS. 29 to 32, the arm portion 302 is connected, by means of a screw or a pin 333 inserted in the through hole 311, to a seat frame 332 which rotates with the rotation in the R1 and R2 directions of a rear seat 331 serving as, for example, an automobile seat, and a serrated tip portion 335 and a most distal end portion 336 of a fixed shaft 334 of a hinge mechanism (not shown) of the rear sheet 331 are respectively fitted in the hole 324 and the central recessed portion 323.

Accordingly, in this embodiment, the rotation of the rear seat 331 in the R1 and R2 directions is adapted to be transmitted to the housing 304 by means of the arm portion 302, and the gap forming member 307 is adapted to be fixed to a chassis 337 on which the rear seat 331 is rotatably installed. A backrest 338 connected rotatably to the rear seat 331 is rotatable in C and D directions with respect to the rear seat 331 by means of a hinge mechanism 339.

Figure 33:
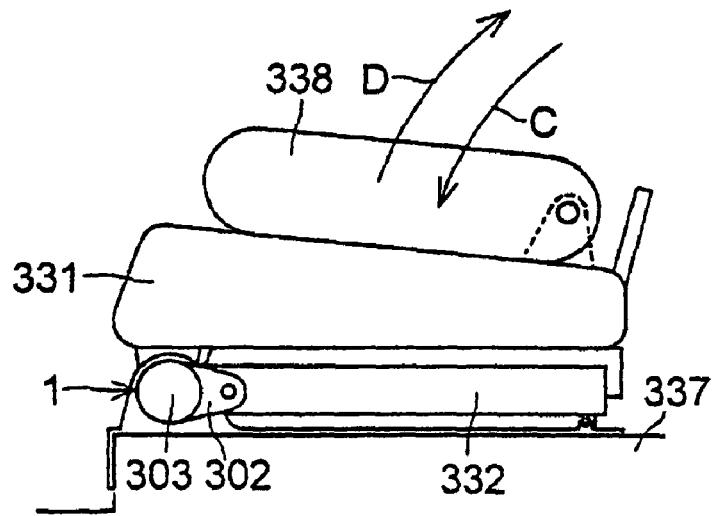
FIG. 33 is a diagram explaining the operation of the embodiment shown in FIG. 29.
Figure 34:
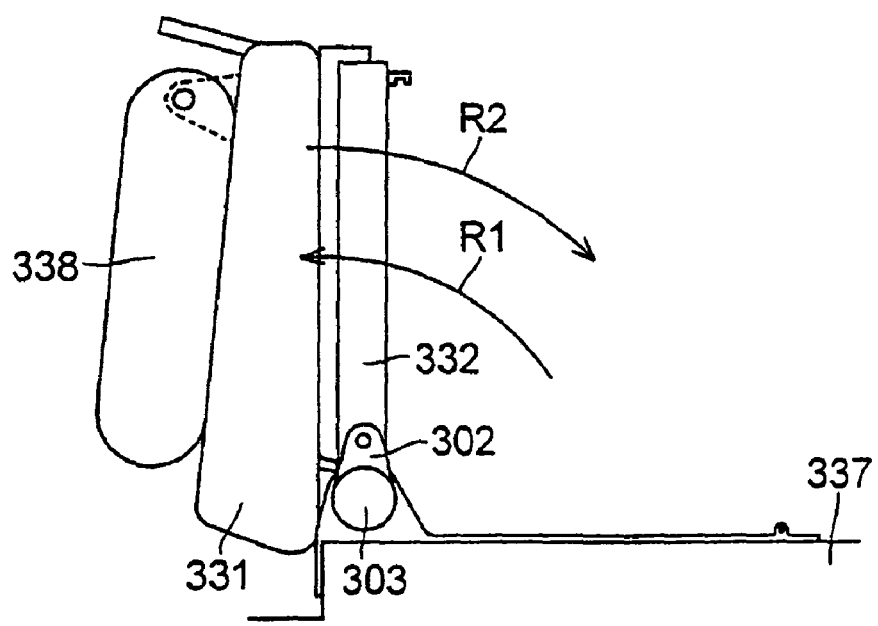
FIG. 34 is a diagram explaining the operation of the embodiment shown in FIG. 29.

The rotation of the seat frame 332 in the R1 direction is normally prohibited by a known lock mechanism 340, and the seat frame 332 is adapted to be rotatable in the R1 direction, as shown in FIG. 34, by the unlocking of the lock mechanism 340. Accordingly, after the backrest 338 is rotated in the C direction, as shown in FIG. 33, if the rear seat 331 is rotated in the R1 direction, as shown in FIG. 34, it is possible to secure a large accommodation space within the vehicle compartment.

In the automobile seat of this example, which includes the above-described damper 1 and the seat, i.e., the rear seat 331 in this embodiment, provided rotatably in the R1 and R2 directions with respect to the chassis 337 of the automobile, and in which the rotation of the rear seat 331 in the R1 and R2 directions is adapted to be transmitted to one of the housing 304 and the gap forming member 307, i.e., the housing 304 in this embodiment, and the other one of the housing 304 and the gap forming member 307, i.e., the gap forming member 307 in this embodiment, is fixed to the chassis 337, deformation can be caused in the silicone-based unvulcanized rubber 4 by the rotation of the housing body 303 in the R1 and R2 directions with respect to the gap forming member 307 via the arm portion 302 in the rotation of the rear seat 331 in the R1 and R2 directions, so as to absorb the rotational energy of the rear seat 331 by the deformation of the silicone-based unvulcanized rubber 4, thereby making it possible to prevent the occurrence of a shock at the time of the rotation. In addition, it is possible to damp the returning of the rear seat 331 in the R2 direction due to the quick start of the automobile with the rear seat 331 sprung up as shown in FIG. 34, and it is possible to damp the springing up of the rear seat 331 in the R1 direction due to sudden braking when the lock mechanism 340 is unlocked.

In addition, according to the damper 1 shown in FIGS. 29 to 32, since the damping function is obtained by the silicone-based unvulcanized rubber 4, there is no possibility of wear, seals for preventing leakage can be omitted, and a large damping force can be easily obtained even if the damper 1 is lightweight and compact. Furthermore, since there are provided the projections 315 and the projections 322 on the inner sides of which the projections 315 are disposed with the gap 306 therebetween, the area of the silicone-based unvulcanized rubber 4 contacting the housing body 303 and the gap forming member 307 can be enlarged at the gap 306, and it is possible to obtain a large energy absorbing capability even if the damper 1 is made compact. In addition, since the slits 325 are formed in the gap forming member 307, it is possible to prevent the slippage of the silicone-based unvulcanized rubber 4 with respect to the gap forming member 307 by virtue of the slits 325. Moreover, when the silicone-based unvulcanized rubber 4 is filled into the gap 306, the filling can be effected through these slits 325, so that the silicone-based unvulcanized rubber 4 can be reliably and easily filled into the gap 306, and it is possible to avoid the occurrence of a gap portion in which the silicone-based unvulcanized rubber 4 is not filled between, on the one hand, the silicone-based unvulcanized rubber 4 and, on the other hand, the housing body 303 and the gap forming member 307.

With the damper 1 shown in FIGS. 29 to 32 referred to above, the arrangement provided is such that the gap forming member 307 is fixed, while the housing 304 is rotated with the rotation of the rear seat 331. Alternately, however, an arrangement may be provided such that the arm portion 302 is secured by means of a screw, a pin, or the like to a bracket 354 installed and secured to the chassis 337, the fixed shaft 334 of the hinge mechanism (not shown) of the rear seat 331 is used as a rotating shaft which is rotated in the same direction as that of the rear seat 331 as the rear seat 331 is rotated in the R1 or R2 direction, and the serrated tip portion 335 and the most distal end portion 336 of this rotating shaft are respectively fitted in the hole 324 and the central recessed portion 323 of the gap forming member 307. The housing 304 is thereby fixed by means of the arm portion 302 to the chassis 337 on which the rear seat 331 is rotatably installed, so as to transmit the rotation of the rear seat 331 to the gap forming member 307.

Figure 35:
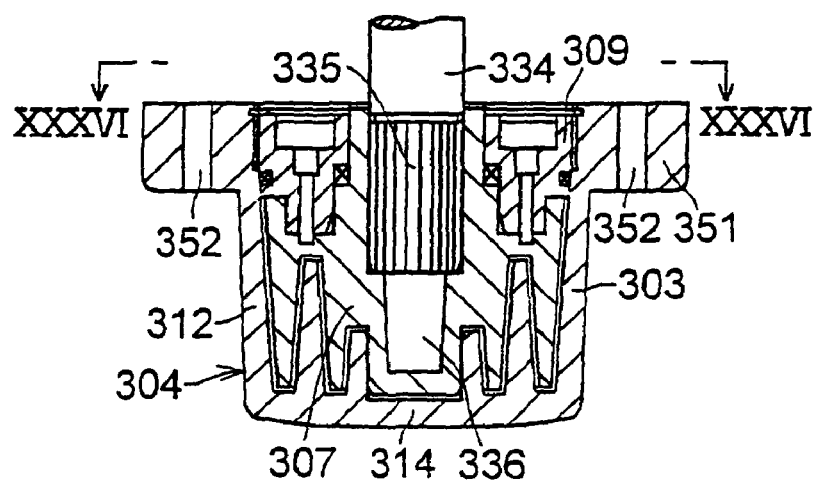
FIG. 35 is an explanatory diagram of a further preferred embodiment of the invention.
Figure 36:
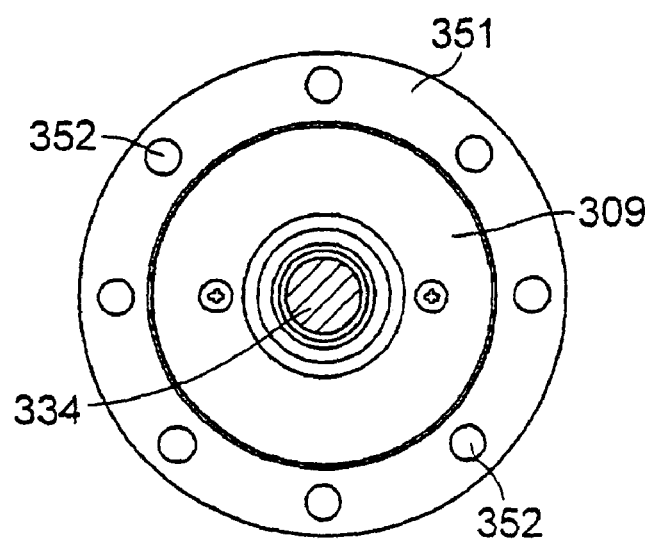
FIG. 36 is a view taken in the direction of arrows along line XXXVI-XXXVI shown in FIG. 35.

Furthermore, although in the above-described embodiment the damper 1 is constructed by including the housing 304 which integrally has the arm portion 302 and the housing body 303, the damper 1 may be alternatively constructed by including the housing 304 which integrally has an annular collar portion 351 and the housing body 303, as shown in FIGS. 35 and 36. In this case, the collar portion 351 having a plurality of through holes 352 into which screws, pins, or the like for fixing are inserted is provided integrally on the hollow cylindrical member 312 of the housing body 303.

In the damper 1 shown in FIGS. 35 and 36 as well, an arrangement may be provided such that the collar portion 351 is secured by means of screws, pins, or the like to one end of a connecting member (not shown) having the other end secured to the seat frame 332, and the rotation of the rear seat 331 in the R1 and R2 directions is thereby transmitted to the housing 304 by means of the collar portion 351, while the gap forming member 307 is fixed to the chassis 337 on which the rear seat 331 is installed so as to be rotatable in the R1 and R2 directions. Alternately, an arrangement may be provided such that the collar portion 351 is secured by means of screws, pins, or the like to the bracket 354 installed and secured to the chassis 337, the fixed shaft 334 of the hinge mechanism (not shown) of the rear seat 331 is used as the rotating shaft which is rotated in the same direction as that of the rear seat 331 as the rear seat 331 is rotated in the R1 or R2 direction, and the serrated tip portion 335 and the most distal end portion 336 of this rotating shaft are respectively fitted in the hole 324 and the central recessed portion 323 of the gap forming member 307. The housing 304 is thereby fixed by means of the collar portion 351 to the chassis 337 on which the rear seat 331 is installed in such a manner as to be rotatable in the R1 and R2 directions, so as to transmit the rotation of the rear seat 331 in the R1 and R2 directions to the gap forming member 307.

Figure 37:
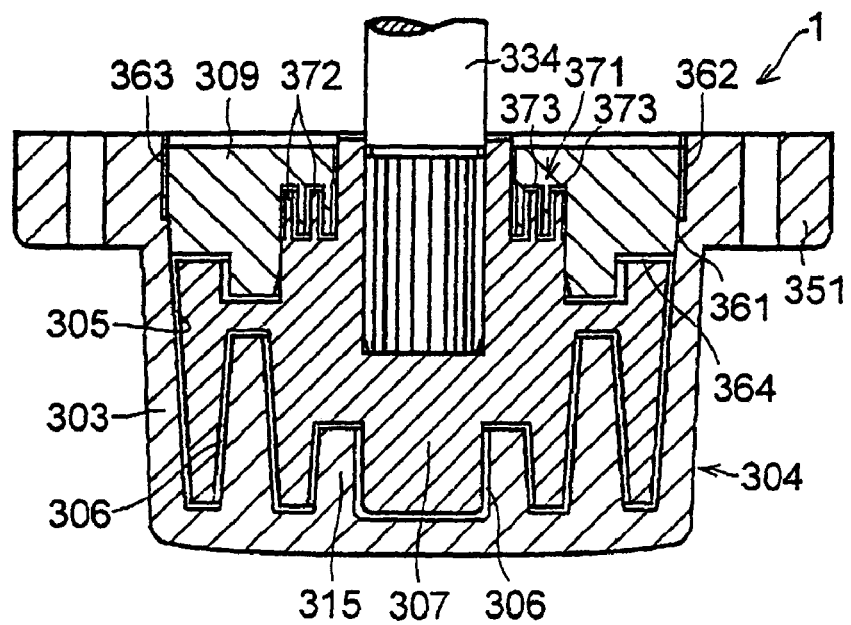
FIG. 37 is an explanatory diagram of a further preferred embodiment of the invention.

Although in the above-described embodiment the cover member 309 is secured to the gap forming member 307 by means of the screws 326, an arrangement may be alternatively provided such that, as shown in FIG. 37, by using the cover member 309 having an externally threaded portion 362 on its outer peripheral surface 361 and the housing 304 having an internally threaded portion 363 on the inner surface 305 of the housing body 303, the cover member 309 is secured to the housing body 303 by threadedly engaging the externally threaded portion 362 with the internally threaded portion 363, and the cover member 309 is fixed to or rotated together with the housing body 303. In this case, if a gap 364 communicating with the gap 306 is also provided between the cover member 309 and the gap forming member 307, and the silicone-based unvulcanized rubber 4 is filled also in the gap 364, it is possible to obtain an even greater energy absorbing capability. In addition, as in the case of the damper 1 shown in FIG. 37, the central recessed portion 323 of the gap forming member 307 and the most distal portion 336 of the fixed shaft 334 may be omitted. Further, the seal members 327 and 328 may be omitted, and a labyrinth mechanism 371 may be provided between the cover member 309 and the gap forming member 307 instead of the seal members 327 and 328.

Figure 38:
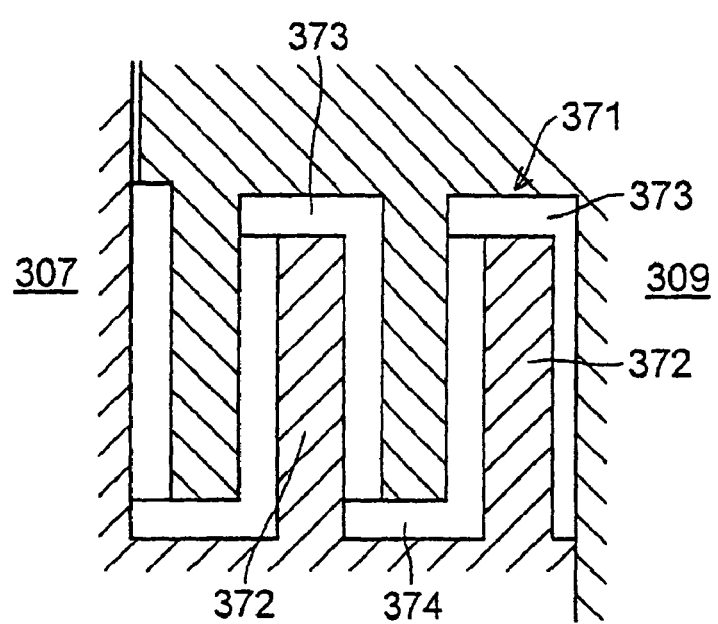
FIG. 38 is a partially enlarged explanatory diagram of the embodiment shown in FIG. 37.

The labyrinth mechanism 371 illustrated in detail in FIG. 38 has a plurality of concentric hollow cylindrical projections 372 formed integrally on the gap forming member 307 and a plurality of concentric recessed portions 373 which are provided in the cover member 309 and into which the respective projections 372 are inserted, and a labyrinth 374 is formed by the projections 372 and the recessed portions 373. The leakage of the silicone-based unvulcanized rubber 4 to the outside from the gap between the cover member 309 and the gap forming member 307 may be prevented by such a labyrinth 374.

Figure 39:
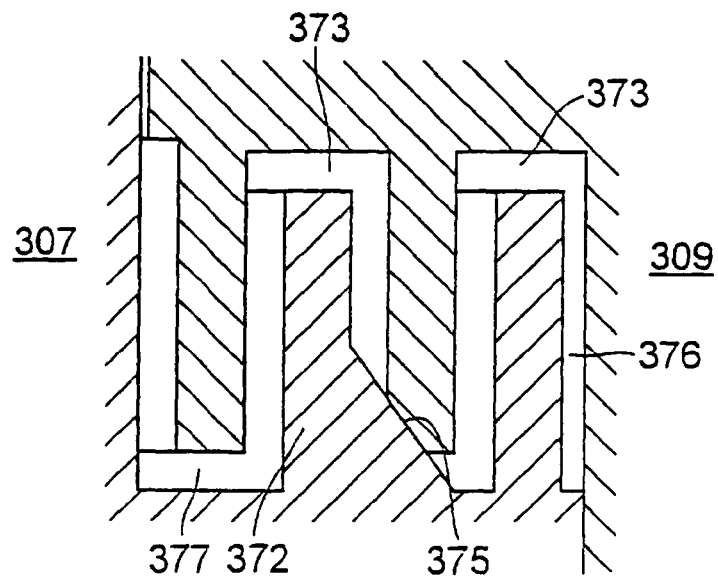
FIG. 39 is a partially enlarged explanatory diagram of a further preferred embodiment of the invention.

In addition, the labyrinth mechanism 371 may be constructed such that, as shown in FIG. 39, an annular inclined surface 375 is provided on one of the projections 372, and this inclined surface 375 is caused to abut against the cover member 309, in order to form the labyrinth mechanism 371 by separated labyrinths 376 and 377. According to the labyrinth mechanism 371 shown in FIG. 39, it is possible to prevent the leakage of the silicone-based unvulcanized rubber 4 more reliably.

Figure 40:
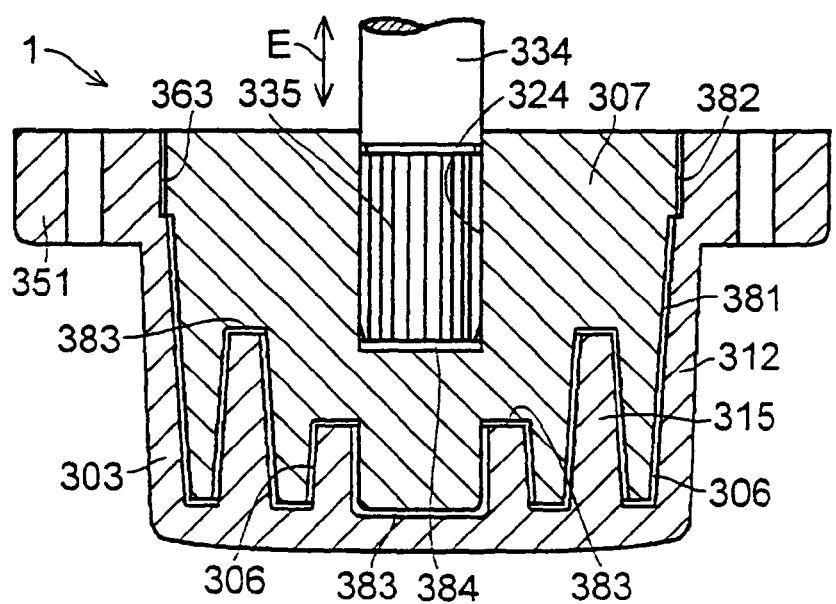
FIG. 40 is an explanatory diagram of a further preferred embodiment of the invention.

Although in the above-described embodiments the cover member 309 which is separate from the gap forming member 307 is provided, the damper 1 may be constructed by omitting the cover member 309, as shown in FIG. 40. In this case as well, the prevention of the gap forming member 307 from coming off the hollow cylindrical member 312 may be effected by the ring 329 such as an E-ring fitted to the aforementioned hollow cylindrical member 312. Alternately, by using the gap forming member 307 having the externally threaded portion 382 on its outer peripheral surface 381, the externally threaded portion 382 may be threadedly engaged with the internally threaded portion 363 of the housing body 303, and the gap forming member 307 may be fitted in the housing body 303 in such a manner as to be rotatable in the R1 and R2 directions. In this case, to ensure that the gap forming member 307 becomes relatively movable in the axial direction, i.e., in E directions, with respect to the housing body 303 and the fixed shaft (or the rotating shaft) 334 in the relative rotation of the gap forming member 307 in the R1 and R2 directions with respect to the housing body 303, a gap 383 which communicates with the gap 306 and in which the silicone-based unvulcanized rubber 4 is similarly filled is provided between the gap forming member 307 and the housing body 303 with respect to the E directions as well. Meanwhile, a gap 384 in the E directions is provided between the tip portion 335 of the fixed shaft (or the rotating shaft) 334 and the bottom of the hole 324, and the tip portion 335 of the fixed shaft (or the rotating shaft) 334 is made slidable inside the hole 324 of the gap forming member 307 in the E directions with respect to the gap forming member 307. In the case where such an externally threaded portion 382 and an internally threaded portion 363 are used, the volume of the gap 306 including the gap 383 changes with respect to the housing body 303 in the relative rotation of the gap forming member 307 in the R1 and R2 directions with respect to the housing body 303. However, if the pitchwise dimensions of the externally threaded portion 382 and the internally threaded portion 363 are made extremely small, this volumetric change is extremely small, and can be absorbed by the compressibility of the silicone-based unvulcanized rubber 4. In the damper 1 shown in FIG. 40, the silicone-based unvulcanized rubber 4 is made to undergo return deformation by the relative rotation of the gap forming member 307 in the R1 and R2 directions with respect to the housing body 303.

What is claimed is:

1. A damper comprising:
   a pair of members, and
   silicone-based unvulcanized rubber interposed between said pair of members,
   said pair of members being disposed in such a manner as to be rotationally movable with respect to each other,
   said silicone-based unvulcanized rubber having a degree of plasticity of not less than 30 and not more than 420 as measured with a William plastometer, and
   relative rotationally moving energy between said pair of members being absorbed through the plasticity deformation of said silicone-based unvulcanized rubber
   one of said pair of members including a housing which has a housing body,
   another one of said pair of members including a gap forming member accommodated relatively rotatably in said housing body for forming a gap in association with an inner surface of said housing body.

2. The damper according to claim 1, wherein said damper is a damper for an automobile seat, and includes:
   a housing serving as said one member and having an arm portion and a housing body integral to said arm portion; and
   a gap forming member serving as said other member and accommodated rotatably in said housing body, said gap forming member forming a gap in cooperation with an inner surface of said housing body,
   said silicone-based unvulcanized rubber being disposed in the gap, said damper being adapted to transmit the rotation of said automobile seat to said housing by means of said arm portion, and said gap forming member being adapted to be fixed to a chassis on which said automobile seat is rotatably installed.

3. An automobile seat comprising:
   said damper for an automobile seat according to claim 2; and
   a seat provided rotatably on said automobile chassis,
   the rotation of said seat being transmitted to one of said housing and
   said gap forming member, and another one of said housing and said gap forming member being fixed to said chassis.

4. The automobile seat according to claim 3, wherein a backrest is rotatably provided on said seat.

5. The damper according to claim 2, wherein said housing body has a plurality of concentric arcuate projections, and said gap forming member has a plurality of concentric hollow cylindrical recessed portions in which said arcuate projections of said housing body are respectively disposed with the gap therebetween.

6. The damper according to claim 2, wherein a slit extending radially and communicating with the gap is formed in said gap forming member.

7. The damper according to claim 1, wherein at least one of said pair of members has, on a surface thereof in contact with said silicon-based unvulcanized rubber, one of a projection and a groove extending in a direction intersecting a direction of the relative movement.

8. The damper according to claim 7, wherein said surface in contact with said silicone-based unvulcanized rubber includes a cylindrical surface, and one of said projection and said groove extends substantially parallel to a center line of said cylindrical surface.

9. The damper according to claim 7, wherein said surface in contact with said silicone-based unvulcanized rubber includes one of an annular surface and a disk-like surface, and one of said projection and said groove extends in a radial direction of said one of said annular surface and said disk-like surface.

10. The damper according to claim 1, wherein said silicone-based unvulcanized rubber has a degree of plasticity of not less than 60 and not more than 320.

11. The damper according to claim 1, wherein said silicone-based unvulcanized rubber has a degree of plasticity of not less than 160 and not more than 320.

12. The damper according to claim 1, wherein at least one of said pair of members has an uneven surface in contact with said silicone-based unvulcanized rubber, and said uneven surface prevents the slippage of said silicone-based unvulcanized rubber in a vicinity of said uneven surface in the relative movement of said pair of members.

13. The damper according to claim 1, wherein said damper is a damper for an automobile seat, and includes:
    a housing serving as said one member and having an arm portion and a housing body integral to said arm portion; and
    a gap forming member serving as said other member and accommodated rotatably in said housing body, said gap forming member forming a gap in cooperation with an inner surface of said housing body,
    said silicone-based unvulcanized rubber being disposed in the gap, said housing being adapted to be fixed by means of said arm portion to a chassis on which said automobile seat is rotatably installed, and said damper being adapted to transmit the rotation of said automobile seat to said gap forming member.

14. The damper according to claim 1, wherein said damper is a damper for an automobile seat, and includes:
    a housing serving as said one member and having a collar portion and a housing body integral to said collar portion; and
    a gap forming member serving as said other member and accommodated rotatably in said housing body, said gap forming member forming a gap in cooperation with an inner surface of said housing body,
    said silicone-based unvulcanized rubber being disposed in the gap, said damper being adapted to transmit the rotation of said automobile seat to said housing by means of said collar portion, and said gap forming member being adapted to be fixed to a chassis on which said automobile seat is rotatably installed.

15. The damper according to claim 1, wherein said damper is a damper for an automobile seat, and includes:
    a housing serving as said one member and having a collar portion and a housing body integral to said collar portion; and
    a gap forming member serving as said other member and accommodated rotatably in said housing body, said gap forming member forming a gap in cooperation with an inner surface of said housing body,
    said silicone-based unvulcanized rubber being disposed in the gap, said housing being adapted to be fixed by means of said collar portion to a chassis on which said automobile seat is rotatably installed, and said damper being adapted to transmit the rotation of said automobile seat to said gap forming member.

16. A method for manufacturing a damper comprising:
providing a pair of members disposed in such a manner as to be rotationally movable with respect to each other;
interposing silicone-based unvulcanized rubber between said pair of members,
fashioning said silicone-based unvulcanized rubber to have a degree of plasticity of not less than 30 and not more than 420 as measured with a William plastometer; and
structuring the pair of members such that relative rotationally moving energy between said pair of members is absorbed through the plasticity deformation of said silicone-based unvulcanized rubber.

* * * * *